United States Patent [19]
Arlton et al.

[11] Patent Number: 5,597,138
[45] Date of Patent: Jan. 28, 1997

[54] YAW CONTROL AND STABILIZATION SYSTEM FOR HELICOPTERS

[76] Inventors: Paul E. Arlton; David J. Arlton, both of 1132 Anthrop Dr., Lafayette, Ind. 47906

[21] Appl. No.: 292,719

[22] Filed: Aug. 18, 1994

Related U.S. Application Data

[63] Continuation-in-part of Ser. No. 233,159, Apr. 25, 1994, which is a continuation-in-part of Ser. No. 770,013, Sep. 30, 1991, Pat. No. 5,305,968.

[51] Int. Cl.$^6$ ................................................. B64C 27/78
[52] U.S. Cl. .................... 244/17.13; 416/31; 416/223 R; 416/212 R
[58] Field of Search ............................ 244/17.11, 17.13, 244/17.19, 17.21; 416/30, 31, 18, 204 R, 202, 212 R, DIG. 2, 223 R

[56] References Cited

U.S. PATENT DOCUMENTS

| | | | |
|---|---|---|---|
| 1,781,883 | 11/1930 | Reed | 416/212 |
| 2,250,826 | 7/1941 | Evevls | 416/202 |
| 2,384,516 | 9/1945 | Young . | |
| 2,689,099 | 9/1954 | Lightfoot . | |
| 3,004,736 | 10/1061 | Culver et al. . | |
| 3,027,948 | 4/1962 | Goland et al. . | |
| 3,211,235 | 10/1965 | Bretl . | |
| 3,528,633 | 9/1970 | Knemeyer . | |
| 3,532,302 | 10/1970 | Dean . | |
| 4,028,003 | 6/1977 | Krauss | 416/DIG. 2 |
| 4,118,143 | 10/1978 | Kavan | 416/31 |
| 4,272,041 | 6/1981 | Mabuchi et al. . | |
| 4,427,344 | 1/1984 | Perry | 416/223 R |
| 4,759,514 | 7/1988 | Burkam . | |
| 4,790,724 | 12/1988 | Bousquest et al. | 416/223 R |
| 5,305,968 | 4/1994 | Arlton | 244/17.19 |
| 5,332,362 | 7/1994 | Toulmay et al. | 416/223 R |

FOREIGN PATENT DOCUMENTS

| | | | |
|---|---|---|---|
| 2834786 | 2/1980 | Germany | 416/212 R |

OTHER PUBLICATIONS

Rock, Gene, SSP-5, *American Aircraft Modeler*, 1973, pp. 41–45 and 76–79.

Information concerning the Graupner Heim helicopter contained in *Neuheiten '91*, pp. 22–23. Illustrations show the structure of the helicopter including the main rotor, frame, and landing gear.

Builidng Instructions for the Champion model helicopter produced by Hubschrauber Schluter. Two pages. Date unknown.

(List continued on next page.)

*Primary Examiner*—Galen L. Barefoot
*Attorney, Agent, or Firm*—Barnes & Thornburg

[57] ABSTRACT

A device for stabilizing yaw motion is provided for use on a helicopter having a main rotor rotatable about a main rotor axis, a power source, and a tail rotor boom with a longitudinal axis. The device includes a tail rotor and a gyroscopic mechanism. The tail rotor is mounted to the tail boom of a helicopter and is rotated about a tail rotor axis by the power source to generate a thrust force transverse to the tail boom and offset from the main rotor axis. The gyroscopic mechanism automatically varies the thrust force generated by the tail rotor to oppose yaw motions. The gyroscopic mechanism includes first and second variable pitch gyro arms extending along first and second gyro arm pitch axes, respectively, a support mechanism, and a pitch adjustor linkage. The support mechanism is configured to support the variable pitch gyro arms for pivotable movement about a gyro pivot axis between a nominal orientation and a tilted orientation so that the variable pitch gyro arms pivot about the gyro pivot axis from the nominal orientation toward the tilted orientation in response to yaw motion encountered by the gyro arms during flight to vary the thrust generated by the tail rotor. The pitch adjustor linkage is appended to the first gyro arm to adjust the pitch of the first gyro arm about the first gyro arm pitch axis.

112 Claims, 18 Drawing Sheets

OTHER PUBLICATIONS

Building Plans for X–Cell thirty and forty series model helicopter produced by Miniature Aircraft USA, 1989, two pages.

Sales brochure for the Petit Helicopter, Sports Flight Helicopter, and helicopter accessories contained in the sales catalog for Hirobo Limited. Three pages. Date unknown.

Sales brochure for the Whisper Electric helicopter distributed by hobby dyamics Distributors. One Page. Date unknown.

*Rotary Modeler*, May/ Jun., 1992. One page.

Robinson, Frank, *Increasing Tail Rotor Thrust and Comments on Other Yaw Control Devices, Journal of the American Helicopter Society*, pp. 46–52, 1970.

Prouty, Raymond, W., *Helicopter Performance, Stability, and Control*, Title page and pages 187, 188, and 191, 1990.

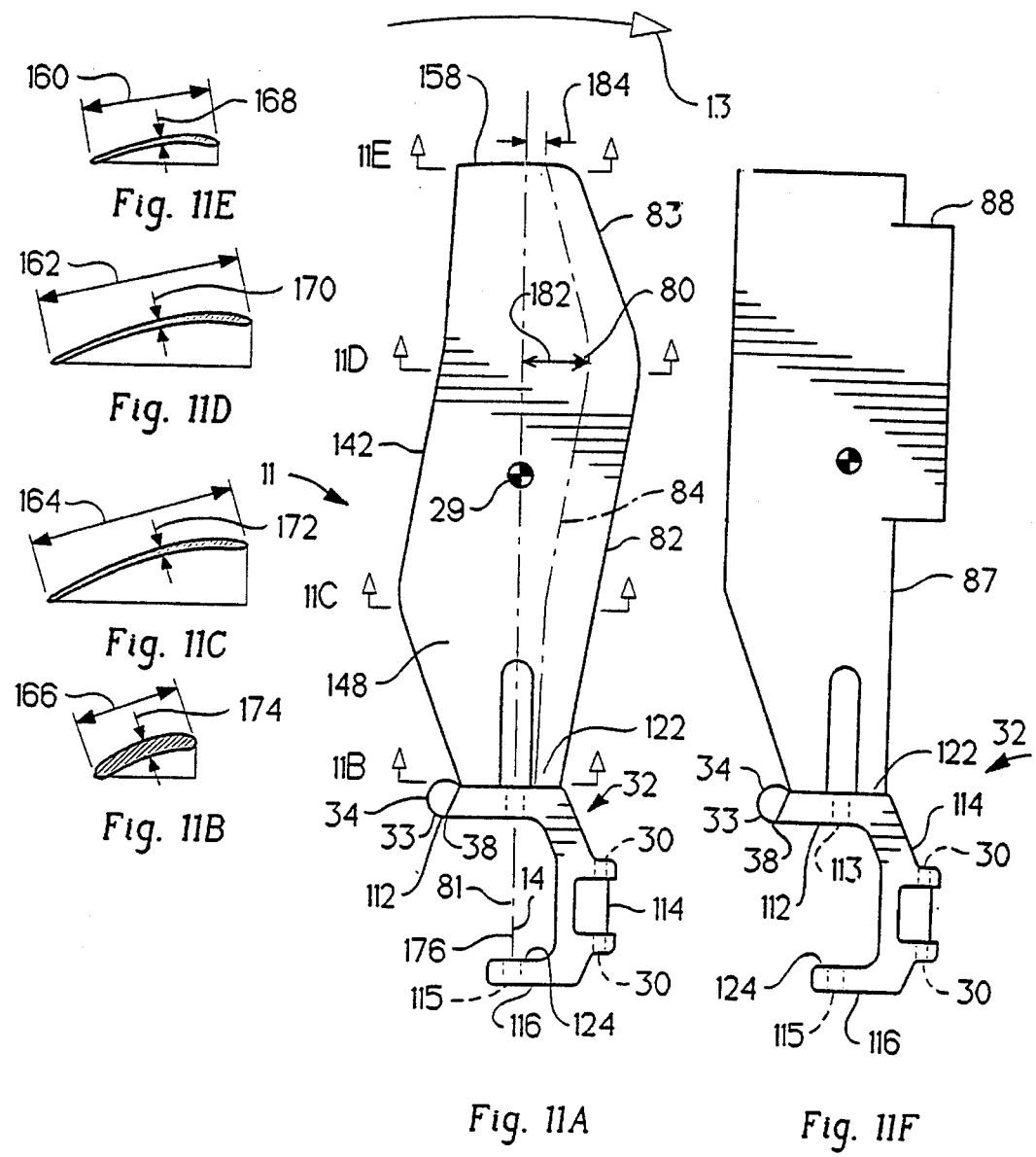

YAW CONTROL AND STABILIZATION SYSTEM FOR HELICOPTERS

BACKGROUND AND SUMMARY OF THE INVENTION

This application is a continuation-in-part application of U.S. application No. 08/233,159, filed Apr. 25, 1994, which is a continuation-in-part application of U.S. application No. 07/770,013, filed Sep. 30, 1991, now U.S. Pat. No. 5,305,968.

This invention relates to the field of yaw control systems for both model and full-size helicopters, and particularly, to a helicopter yaw (right-left heading) stabilizing system. More particularly, the invention relates to a gyroscopic mechanism mounted on a helicopter tail rotor assembly and configured to vary tail rotor thrust automatically to produce a yaw moment stabilizing the helicopter in flight so that the helicopter is able to fly in a direction (heading) selected by the pilot, whether the pilot is onboard a full-size helicopter or commanding a model helicopter by remote control.

Helicopters are flying machines having the ability to hover and fly forwards, backwards, and sideways. This agility stems from the multiple capabilities of the main rotor system. Since the invention of helicopters in the 1930's considerable effort has been expended advancing helicopter technology, with a substantial percentage of that effort concentrated on main rotor systems. Less effort has been applied to develop better tail rotor systems.

While the technology of full-size helicopters progressed for decades, model helicopters remained impractical for lack of suitable engines, radio control equipment, and construction materials. Model helicopter designers often copied the designs of full-size helicopters without understanding the basic differences between full-size and model aircraft. As a result, scaled-down model helicopters were typically unstable in flight and underpowered.

In the 1970's hobbyists developed the first practical model helicopters. Lighter radio control equipment, more powerful engines, and systematic engineering all contributed to early successes. Much of model helicopter design, however, is rooted in tradition. Even though helicopter technology has advanced considerably since that time, the designs and design philosophies of that era are still in widespread use.

While model and full-size helicopters are mechanically similar, the aerodynamics, operational speeds, and weights of model helicopters are vastly different from those of their full-size counterparts. Model helicopter rotor blades operate within a low speed range where aerodynamic drag due to the thickness of the rotor blade airfoil becomes very important. Early attempts to use the thick airfoils used on full-size helicopters failed in part because engines then available could not overcome the high drag of the rotor blades. The present invention addresses the needs of both model and full-size helicopters for higher efficiency rotor systems.

All single-rotor helicopters require some sort of antitorque or yaw control system in order to maintain directional control in flight. Several different yaw control devices have been developed (such as blown tail booms and shrouded fans), but traditional tail rotor systems have remained essentially unchanged for 25 years.

In general, maintaining the stable yaw orientation (right-left heading) of a helicopter in hover or low-speed flight can be a difficult business for the pilot. To counterbalance the constantly changing torques on the helicopter fuselage produced by the main rotor blades and atmospheric conditions such as lateral wind gusts, helicopter pilots must continually manipulate the yaw controls of their aircraft. This is especially true for model helicopters because of their small size and low mass, and the resulting tendency to react rapidly to disturbances.

Electronic gyro-stabilizer systems are now widely available for use on the tail rotor controls of both model and full-size helicopters to help pilots cope with yaw instability. These systems, however, are typically heavy and expensive, and often require an additional electric power supply aboard the helicopter. Some existing mechanical stabilization systems interfere with pilot control or forcibly feed back into the pilot's controls.

What is needed is a yaw control and stabilization system for a helicopter which is simple, lightweight, and inexpensive, which requires little power to operate, and which does not unduly inhibit pilot control for normal maneuvering.

One object of the present invention is to provide an improved device for controlling and automatically stabilizing the yaw motion of a model or full-size helicopter.

Another object of the present invention is to provide low-moment, high-lift rotor elements for general application on rotor systems of model or full-size helicopters.

Generally speaking, there is disclosed herein a device for controlling and automatically stabilizing the yaw motion of a model helicopter and/or a full-size helicopter. Such device comprises a primary tail rotor assembly generally mounted at the end of a helicopter tail boom and extending rearward from the helicopter fuselage and a yaw stabilization mechanism generally supported by tail rotor blade pitch varying control elements of the tail rotor and operating as an offset to the pilot's tail rotor thrust-varying controls.

The stabilization mechanism includes gyroscopically actuated rotors and rotor drive means which are generally located at an outboard end of the tail rotor assembly and which automatically vary the thrust generated by the tail rotor assembly to stabilize yaw motion of the helicopter in flight.

More specifically, on a helicopter, a yaw control and stabilization device includes a primary tail rotor with a plurality of tail rotor blades extending radially from a hollow rotor shaft which is mounted for rotation about a transverse rotor axis, a push-pull rod extending through a hollow shaft and operably connected to the tail rotor blades to manually vary the collective pitch of the tail rotor blades, and a gyroscopic assembly mounted on the tail rotor assembly.

The gyroscopic assembly has a gyro rotor mounted to rotate with the tail rotor, to pivot about a substantially longitudinal pivot axis by and at the outboard end of the push-pull rod, and to vary automatically the collective pitch of the tail rotor blades in response to yaw motion of the helicopter. The gyro rotor has paddles or rotor blades to aerodynamically damp gyro motion and/or augment tail rotor thrust. The gyroscopic assembly further includes a pitch slider operably connected with the push-pull rod, primary tail rotor, and gyro rotor to move generally as a unit with the push-pull rod in order to vary the collective pitch of the tail rotor blades upon manual movement of the push-pull rod relative to the rotor shaft, and to be automatically slid relative to the push-pull rod in order to vary the collective pitch of the tail rotor blades upon precession of the gyro rotor.

Advantageously, the aerodynamic paddles or rotor blades included in the gyroscopic assembly in accordance with the present invention are constructed so as to be cyclically pitchable in response to pivoting of the gyro rotor to generate aerodynamic restoring forces in opposition to pivoting of the gyro rotor so as to restore the gyro rotor to a nominal orientation during helicopter flight at the proper times. Concurrent with the cyclic pitching of the gyro rotor paddles, one variant of the present invention provides for collective pitching of the gyro paddles in response to collective pitching of the tail rotor blades. Simultaneous cyclic and collective pitching advantageously allows the gyroscopic assembly to serve both a stabilizing and thrust producing function.

Further, a helicopter tail rotor in accordance with the present invention includes low pitching-moment rotor blades configured for use with the gyroscopic stabilization system. The blades have an aerodynamic center of pressure located ahead of the pitching axis and mass balancing means to minimize the pitching forces felt at the root of the blades. In addition, a device for operably connecting the tail rotor blades to a tail rotor hub comprises interconnected reach-around grip means operably connecting the roots of the tail rotor blades with each reach-around grip means engaging the side of the tail rotor hub opposite to its respective blade.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIGS. 11A and 11F are plan views of different configurations of the tail rotor blades in accordance with the present invention situated next to typical cross sections 11B through 11E of selected spanwise stations;

DETAILED DESCRIPTION OF THE DRAWINGS

Figure 1:
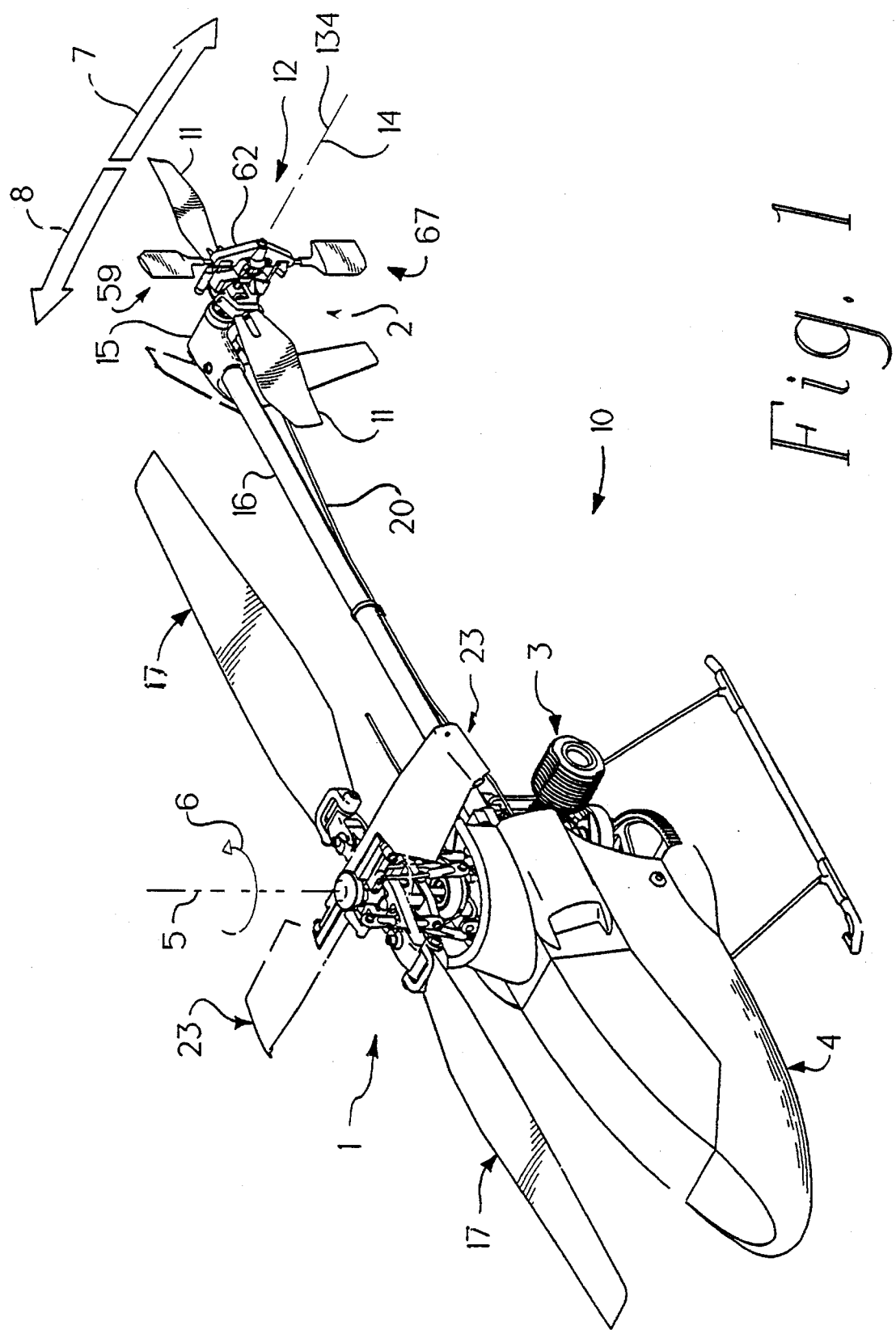
FIG. 1 is a perspective view of a representative helicopter including a tail assembly fitted with an improved yaw control and stability system in accordance with a preferred embodiment of the present invention.
Figure 2:
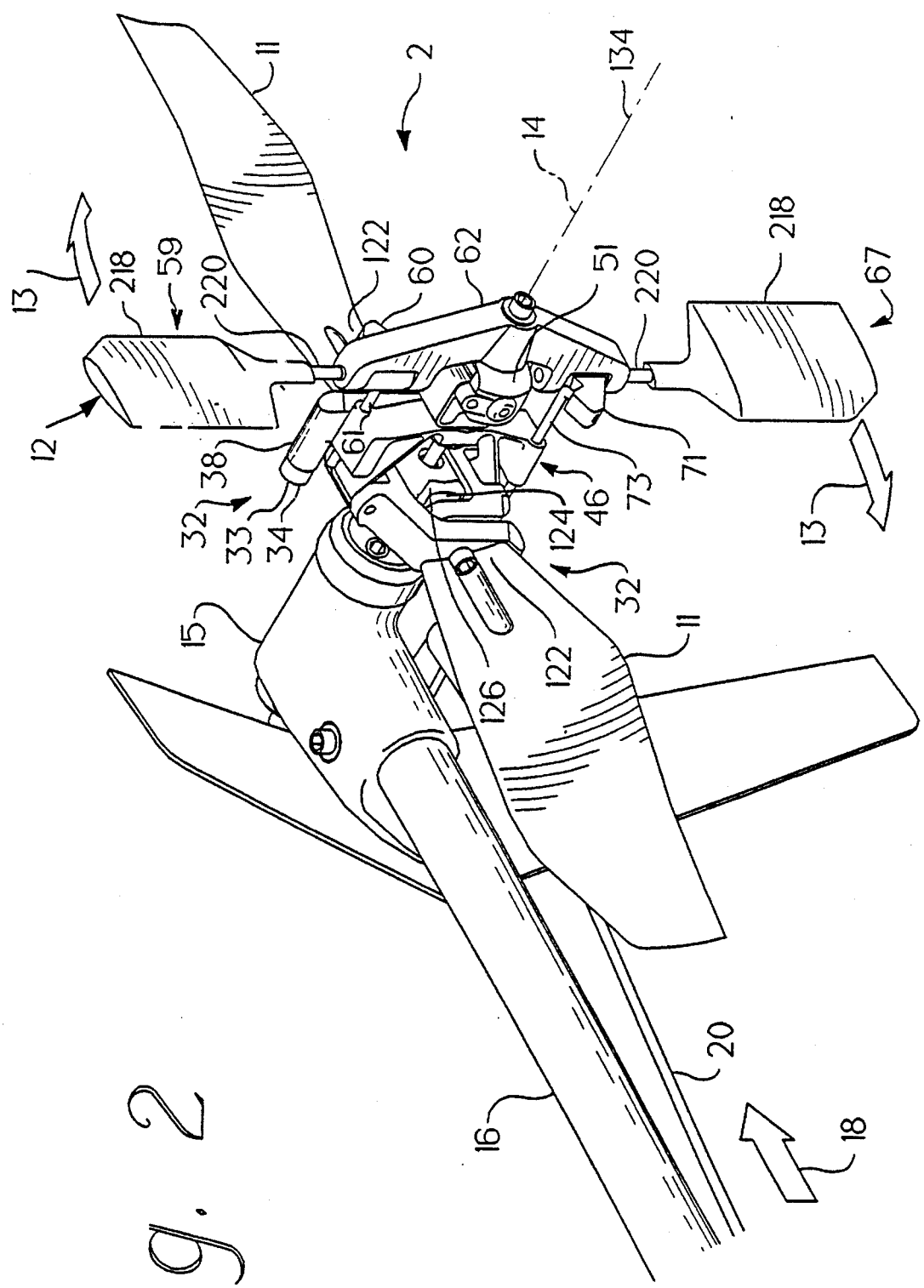
FIG. 2 is an enlarged view of the helicopter tail assembly illustrated in FIG. 1.

Referring to FIG. 1, a helicopter 10 is commonly designed to include a large main rotor 1 which rotates about main rotor axis 5 and lifts helicopter 10 into the air and a smaller tail rotor 2 which rotates about tail rotor axis 16 and is used to counteract the torque produced by main rotor 1 and to steer helicopter 10. Tail rotor 2 is mounted at a rear end of tail boom 16 as shown in FIGS. 1 and 2.

Both main rotor 1 and tail rotor 2 are driven by an engine 3 usually located within the helicopter fuselage (body) near the vertical main rotor shaft. Although helicopter 10 shown in FIG. 1 is a model helicopter, it will be understood that man-carrying helicopters (not shown) also include engine-driven main and tail rotors. A detailed description of a suitable helicopter main rotor system is disclosed in Paul E. Arlton's U.S. patent application No. 08/233,159, filed Apr. 25, 1994, which is hereby incorporated by reference herein.

Illustratively, main rotor 1 rotates about a main rotor shaft aligned with main rotor axis 5 and includes a pair of rotor blades 17 and a pair of shorter subrotor blades 23.

A streamlined fuselage shell or canopy 4 covers a front portion of the helicopter 10 as shown in FIG. 1. In use, a radio-controlled command unit (not shown) and other drive mechanisms are contained inside canopy 4. Canopy 4 is designed for use on a model helicopter such as helicopter 10 to protect the radio control unit and to provide the appearance of a pilot-carrying helicopter. Canopy 4 does not extend back to the tail rotor 2 on helicopter 10.

Angular motions of helicopter 10 about main rotor axis 5 are called yaw motions. Forces that tend to rotate helicopter 10 about main rotor axis 5 and change the azimuthal heading of helicopter 10 are called yaw moments or yaw torques.

Conventionally, the pilot of a full-size helicopter controls the pitch of the tail rotor blade by manipulating foot pedals located within the helicopter cockpit. Cables, push-pull rods, and bellcranks connect the foot pedals to the pitch controls of the tail rotor blades. As the pilot adjusts the pedal position, the change in angle-of-attack (pitch) and associated thrust force of the rotating tail rotor blades results in a yaw moment about main rotor axis 5. This moment is directed to maneuver the helicopter and/or to oppose any destabilizing yaw moment sensed by the pilot.

Tail rotors of radio-controlled model helicopters operate in an manner identical to full-size helicopters. The helicopter pilot on the ground manipulates small joysticks on a hand-held radio transmitter (not shown) which in turn sends radio commands to electro-mechanical servo actuators (not shown) located within the flying model helicopter. Push-pull rods and bellcranks connect the servos to the collective pitch controls of the tail rotor blades included in the model helicopter.

In operation, main rotor 1 of helicopter 10 rotates rapidly about main rotor axis 5 in rotation direction 6. As it does so, main rotor blades 17 act like. propellers or fans moving large amounts of air downward thereby creating a force that lifts helicopter 10 upward. The torque (reaction force) created by rotating main rotor 1 in rotation direction 6 tends to cause helicopter 10 to swing about main rotor axis 5 in yaw direction 7. When trimmed for steady hovering flight, tail rotor 2 creates enough thrust force in direction 7 to cancel exactly the torque produced by main rotor 1 so that helicopter 10 maintains a constant heading. Decreasing or increasing the thrust force generated by tail rotor 2 will cause helicopter 10 to turn in yaw directions 7 or 8 respectively. The magnitude of the thrust force generated by tail rotor 2 can be varied using the pilot-controlled system to vary the collective pitch of tail rotor blades 11. The pilot-controlled system for controlling tail rotor 2 will be described in more detail below.

Tail rotor 2 is rotated about transverse tail rotor axis 14 by a drive linkage passing through gearbox 15 and interconnecting engine 3 and tail rotor 2 to generate a thrust force transverse to tail boom 16 and offset from the vertical axis of rotation 5 of main rotor 1. Gearbox 15 is mounted at the end of tail boom 16 and supports pilot-controlled pushrod 20 extending along tail boom 16 between canopy 4 and gearbox 15. Gearbox 15 encloses ball bearings, drive gears, and a drive shaft that support and drive tail rotor 2.

As shown in FIG. 2, tail rotor 2 of the present invention includes a pair of tail rotor blades 11 and a gyroscopic assembly 12 having gyro arms 59, 67 and gyro hub 62 rotating in rotation direction 13 about tail rotor axis 14. Gyroscopic assembly 12 is mounted on an outboard end of tail rotor 2 and provides a helicopter yaw control and stabilization system for independently changing the pitch of the tail rotor blades 11 in tail rotor 2 automatically and continuously to stabilize the yaw motion of helicopter 10. Thus, the collective pitch of tail rotor blades 11 can be set at a selected pitch angle manually by the pilot using the pilot-control system, while the gyroscopic assembly can vary the collective pitch from the selected pitch angle automatically and continuously in response to yaw motion imparted to helicopter 10 during flight.

Gyroscopic assembly 12 establishes a stabilizing offset supplement or adjustment to the pilot's tail rotor controls. Thus, yaw control signals from the pilot-control system pass directly to tail rotor 2 (through elements 20, 21, 22, 15, etc.) to bring about large changes in the azimuthal heading of helicopter 10. At the same time, gyroscopic assembly 12 mounted on tail rotor 2 functions automatically to vary collectively the pitch of rotor blades 11 from the pitch set by the pilot-control system. This "supplemental pitch control input" provided by gyroscopic assembly 12 stabilizes yaw motion of helicopter 10 in flight without unduly inhibiting pilot control.

Figure 3:
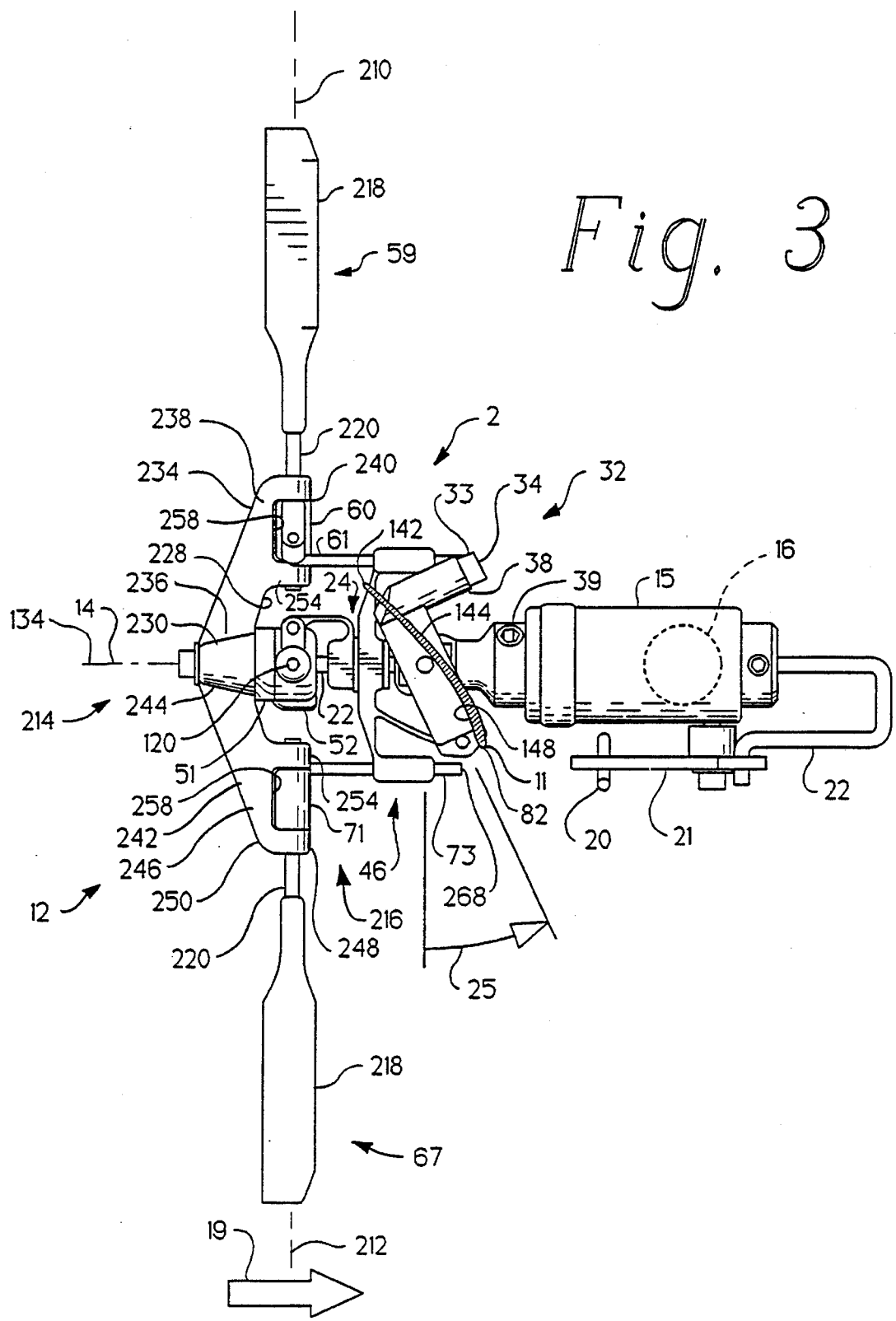
FIG. 3 is a rear elevation view of the helicopter tail assembly shown in FIG. 2 (viewed from the rear of the helicopter facing toward the fuselage) fitted with the present invention showing the effect of pilot control input on the pitch (angle-of-attack) of the tail rotor blades, with one tail rotor blade shown in cross section and all details ahead of the tail rotor gearbox omitted for clarity.
Figure 4:
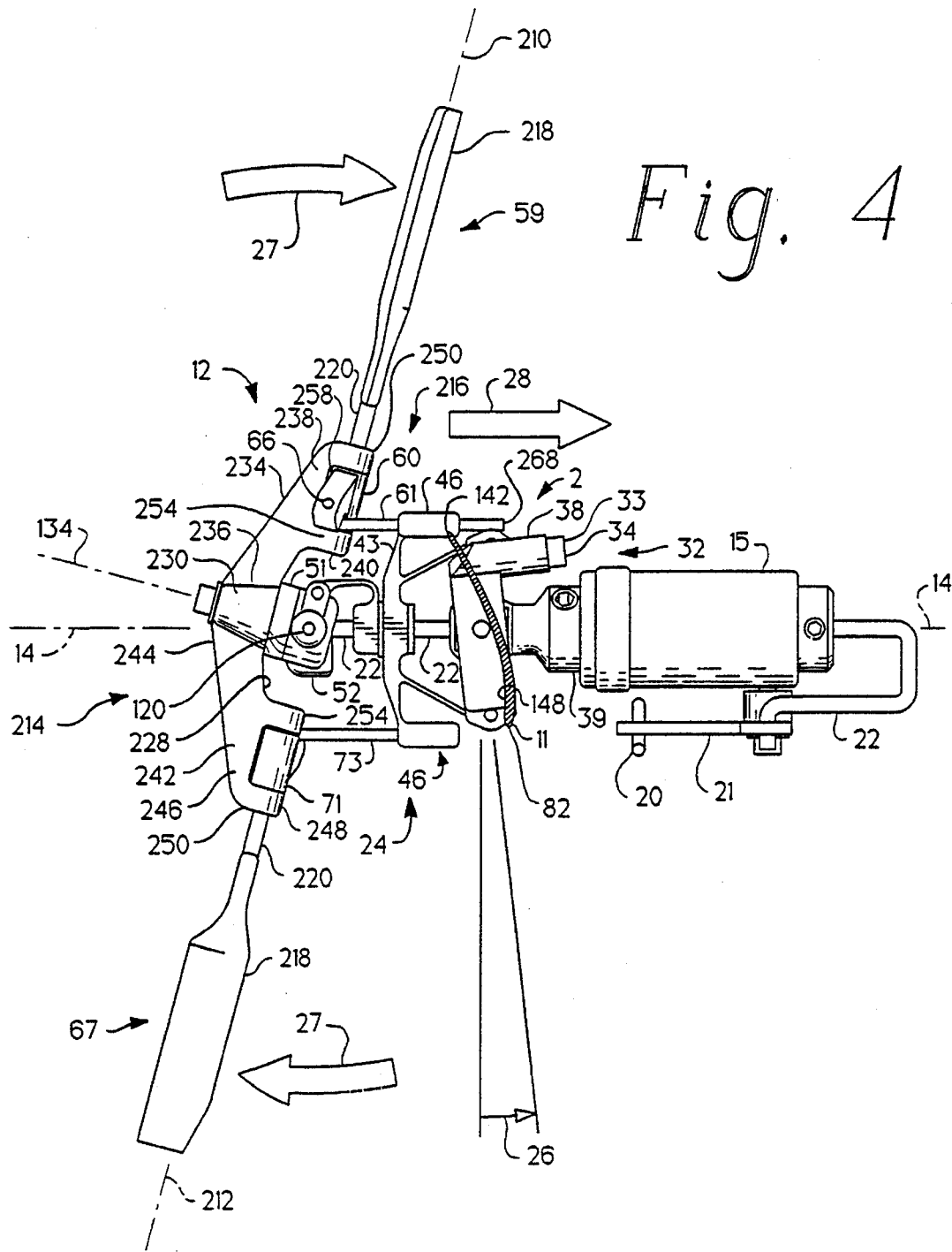
FIG. 4 is a view similar to FIG. 3 showing reaction (e.g., change in pitch or angle-of-attack) to yaw motion of the helicopter of one of the tail rotor blades (shown in cross section) and also of the two gyro paddles included in the gyroscopic assembly slidably mounted on an outboard end of the tail rotor assembly.

Now refer to FIG. 3 which .shows a rear end elevation view of tail rotor 2, gyroscopic assembly 12, and gearbox 15 with helicopter details forward of gearbox 15 removed for clarity. Tail rotor 2 is positioned on tail rotor axis 14 to lie between gear box 15 (mounted on tail boom 16) and gyroscopic assembly 12 as shown in FIGS. 2 and 3. Tail rotor 2 (including tail rotor blades 11) rotates rapidly about tail rotor axis 14 and rotates gyroscopic assembly 12 about tail rotor axis 14 by means of delta-drive bars 61, 73 pivotably connected to gyroscopic assembly 12 and slidably connected to spider 46. Gyroscopic assembly 12 is mounted for controlled sliding movement on the outboard straight end of push-pull rod 22 that projects through tail rotor 2 and away from gear box 15 as shown in FIGS. 3 and 4.

In order to control tail rotor 2 in normal flight, the helicopter pilot can change the pitch, and associated thrust force, of tail rotor blades 11 without affecting gyroscopic assembly 12 using the pilot-control system by moving push-pull rod 22 which extends transversely through the interior of gearbox 15 and tail rotor hub 39 and is fixedly connected to gyro mount 52. For example, to turn in yaw direction 8 (shown in FIG. 1), the pilot pushes pushrod 20 alongside tail boom 16 which rotates bellcrank 21 (shown in more detail in FIG. 6) and causes push-pull rod 22 to slide axially in the direction of control input arrow 19. Gyroscopic assembly 12 and tail rotor blade pitch linkages 24 are operably mounted to, and move along with, push-pull rod 22 in the direction of control input arrow 19 thereby pitching tail rotor blades 11 to a higher angle-of-attack as shown by control pitch arrow 25. This new angle-of-attack, and the associated change in thrust force of tail rotor 2 induces helicopter 10 to turn in yaw direction 8.

Generally, wind gusts or changes in the torque of the main rotor system during flight may cause a helicopter suddenly to yaw (rotate about its main rotor axis). To control this yaw instability, both full-size and model helicopters are frequently equipped with yaw stabilizer systems. Gyro-stabilizer systems can be broadly classified as either mechanical or electro-mechanical. Mechanical systems generally rely on precessional (angular) displacement of a relatively large gyroscopic arm or flywheel mechanism to alter the pitch of the tail rotor blades in opposition to any yaw motion of the helicopter. Electro-mechanical systems sense the precessional (angular) displacement of a relatively small flywheel mechanism, and control the tail rotor blades through electronic amplification and electro-mechanical and/or hydraulic servo actuators. Modern model helicopters frequently carry electro-mechanical gyro stabilizer systems that are electronically mixed into the tail rotor servo control circuit. These gyro systems are relatively expensive and heavy, and draw power from the airborne radio receiver system batteries. An example of an electro-mechanical system designed for full-size helicopters is described in U.S. Pat. No. 3,528,633 to Knemeyer.

Some yaw stabilizer systems, especially more sophisticated electro-mechanical systems, disengage whenever the pilot maneuvers the aircraft. Other systems, most notably mechanical systems, act to suppress all yaw motion of the helicopter including that desired by the pilot. With these mechanical systems the pilot must forcibly override the gyroscopic mechanism in order to control the tail rotor for trimming and normal flight. Since gyroscopic mechanisms tend to resist mechanical displacement, the pilot will feel resistance to control inputs whenever the pilot tries to change the collective pitch of the tail rotor blades manually in order to change the flight direction or heading of the helicopter. This resistance will typically persist as long as the rate of yaw motion is not zero. Generally, these systems tend to increase helicopter stability at the expense of helicopter controllability.

A number of yaw stabilization devices have been developed for use on model and/or full-size helicopters. See, for example, U.S. Pat. Nos. 3,004,736 to Culver and 4,759,514 to Burkam. A mechanical gyro stabilizer mechanism is detailed on page 41 of the March 1973 issue of American Aircraft Modeler magazine (originally located at 733 15th Street N.W., Washington, D.C. 20005).

Recently, the state-of-the-art in yaw stabilization devices has been advanced by development of gyro stabilizers that are connected to the tail rotor and are independent of the pilot-control system so that each of the pilot-control system and the gyro-controlled stabilizer system operates independently to vary the thrust force generated by the tail rotor. Reference is hereby made to U.S. Pat. No. 5,305,968 to Paul E. Arlton, which is hereby incorporated by reference herein, for a description of a suitable device for operating a tail rotor to automatically stabilize the yaw motion of a helicopter. Advantageously, the system disclosed in the Arlton '968 patent permits a helicopter pilot to use the pilot-control system to adjust the pitch on the tail rotor blades in order to set the directional heading of the helicopter and also allows a gyro-controlled stabilizer to change the pitch of the tail rotor blades automatically and continuously (without pilot input) to compensate for unplanned yaw motion without disrupting the pilot (as by increasing resistance to use and operation of the foot pedals). As noted above, wind or other atmospheric disturbances can impart unplanned yaw motion to a helicopter in flight.

FIG. 4 is a view similar to FIG. 3 and illustrates the effect of helicopter yaw motion on gyroscopic assembly 12. In use, yaw motion of helicopter 10 in direction 7 (shown in FIG. 1) applies yaw forces to gyro spindle 51 and gyroscopic assembly 12 causing gyroscopic assembly 12 to precess (tilt) in precession direction 27 about a gyro pivot axis 120. Tilt of gyroscopic assembly 12 actuates tail rotor pitch linkages 24 to slide along push-pull rod 22 in the direction of stabilizing input arrow 28 thereby pitching tail rotor blades 11 to a higher angle-of-attack as shown by stabilizing pitch arrow 26. This new angle-of-attack, and the associated change in thrust force of tail rotor 2 resists the initial yaw motion of helicopter 10. Maximum control pitch from pilot control inputs (as illustrated by control pitch arrow 25 in FIG. 3) generated manually using pushrod 20 is usually greater than maximum stabilizing pitch (as illustrated by stabilizing pitch arrow 26) generated automatically by gyroscopic assembly 12 so that the pilot has control authority to override the gyro stabilizer 12 in order to set the azimuthal heading of helicopter 10 in flight.

The limits of stabilizing pitch generated by gyroscopic assembly 12 can be set in many ways. In the preferred embodiment, gyroscopic assembly 12 is allowed to precess in one direction until tail rotor pitch linkages 24 butt against gyro mount 52, and in the other direction until the inner surfaces of gyro spindle 51 contact gyro mount 52. Once the mechanism reaches a mechanical limit, no further precession is possible, and so no further gyroscopic input to vary the collective pitch of tail rotor blades 11 is possible.

The gyroscopic assembly 12 is normally in a nominal vertical orientation as shown, for example, in FIG. 3. When the helicopter 10 yaws about main rotor axis 10, the gyroscopic assembly 12 tilts away from the nominal orientation to a tilted orientation as shown, for example, in FIG. 4. A mechanism is needed to tilt the gyroscopic assembly 12 back to the nominal orientation from the tilted orientation. In U.S. Pat. No. 5,305,968 to Paul E. Arlton, a spring mechanism was used to return a "tilted" gyroscopic assembly 12 back to the vertical orientation.

In the present invention, gyroscopic assembly 12 includes first and second gyro arms 59, 67 extending along first and second gyro arm pitch axes 210, 212, respectively, a supporting mechanism 214 to support gyro arms 59, 67 for pivotable movement about gyro pivot axis 120 from the nominal orientation to the tilted orientation in response to yaw motions, and a restoring mechanism or pitch adjustor linkage 216. The pitch adjustor linkage 216 restores the gyro arms 59, 67 from their tilted orientation to their nominal orientation by pitching gyro arms 59, 67 about gyro arm pitch axes 210, 212, respectively, to generate an aerodynamic force opposed to the tilting or pivoting motion of the gyro arms 59, 67 away from their nominal orientation as shown, for example, in FIGS. 3, 4, and 8.

Figure 8:
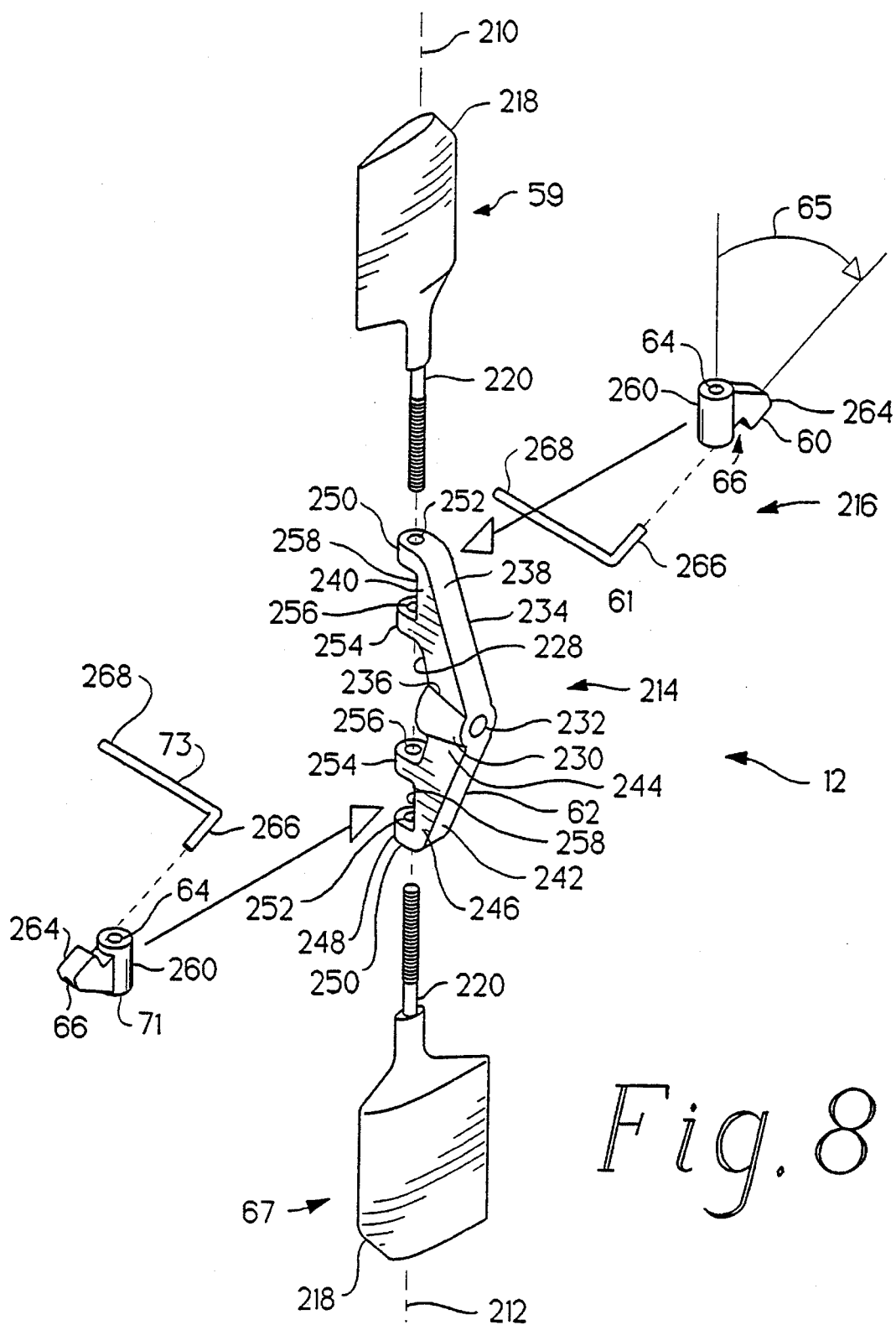
FIG. 8 is an exploded perspective view of gyro rotor elements in accordance with the present invention, with all other parts of the tail rotor assembly omitted for clarity.

Gyro arms 59, 67 may include a gyro paddle 218 and a shank 220, as shown, for example, in FIGS. 3, 4, and 8, an aerodynamic blade 222, as shown, for example, in FIGS. 12–15, or a weighted arm as disclosed in U.S. Pat. No. 5,305,968 to Arlton. Shanks 220 connect gyro paddles 218 to the support mechanism 214 and the pitch adjustor linkage 216 as shown, for example, in FIGS. 3, 4, and 8. Shanks 220 define gyro arm pitch axes 210, 212 as shown, for example, in FIGS. 3, 4, and 8.

Once gyroscopic assembly 12 has tilted, some "mechanism" is needed to return it to a nominal vertical orientation. As gyroscopic assembly 12 tilts in direction 27, delta-drive bars 61, 73 operating within angled drive bar holes 66 formed in delta paddle grips or gyro arm grips 60, 71 (see FIGS. 8 and 9) cause gyro paddles 218 to pitch cyclically (twice per revolution, once upward and once downward) so as to produce an aerodynamic moment opposite to direction 27. This aerodynamic moment restores gyroscopic assembly 12 to a nominal vertical orientation after a short time lag, such time lag being adjustable by varying the size and weight of gyro paddles 218 and delta drive angle 65 (shown more clearly in FIG. 8). When in a nominal vertical orientation, gyro paddles 218 are set to a positive pitch angle into the oncoming airflow and can be used to trim tail rotor 2.

Functionally, gyroscopic assembly 12 establishes a stabilizing offset or adjustment to the pilot's tail rotor controls. Continuous pilot yaw control inputs necessary to swing helicopter 10 to a new heading cause gyroscopic assembly 12 to precess to a preset limit after which point the mechanism no longer acts to counter the yaw motion. Instantaneous control inputs displace (i.e., slide) gyroscopic assembly 12 on the outboard straight end of push-pull rod 22 in a direction substantially parallel to axis of rotation 14. Such linear displacement has no precessional effect on gyroscopic assembly 12, and so the gyroscopic mechanism described herein does not impede such inputs. This means that gyroscopic assembly 12 stabilizes yaw motion of the helicopter 10 in flight, but does not unduly inhibit pilot control of tail rotor 2.

Figure 5:
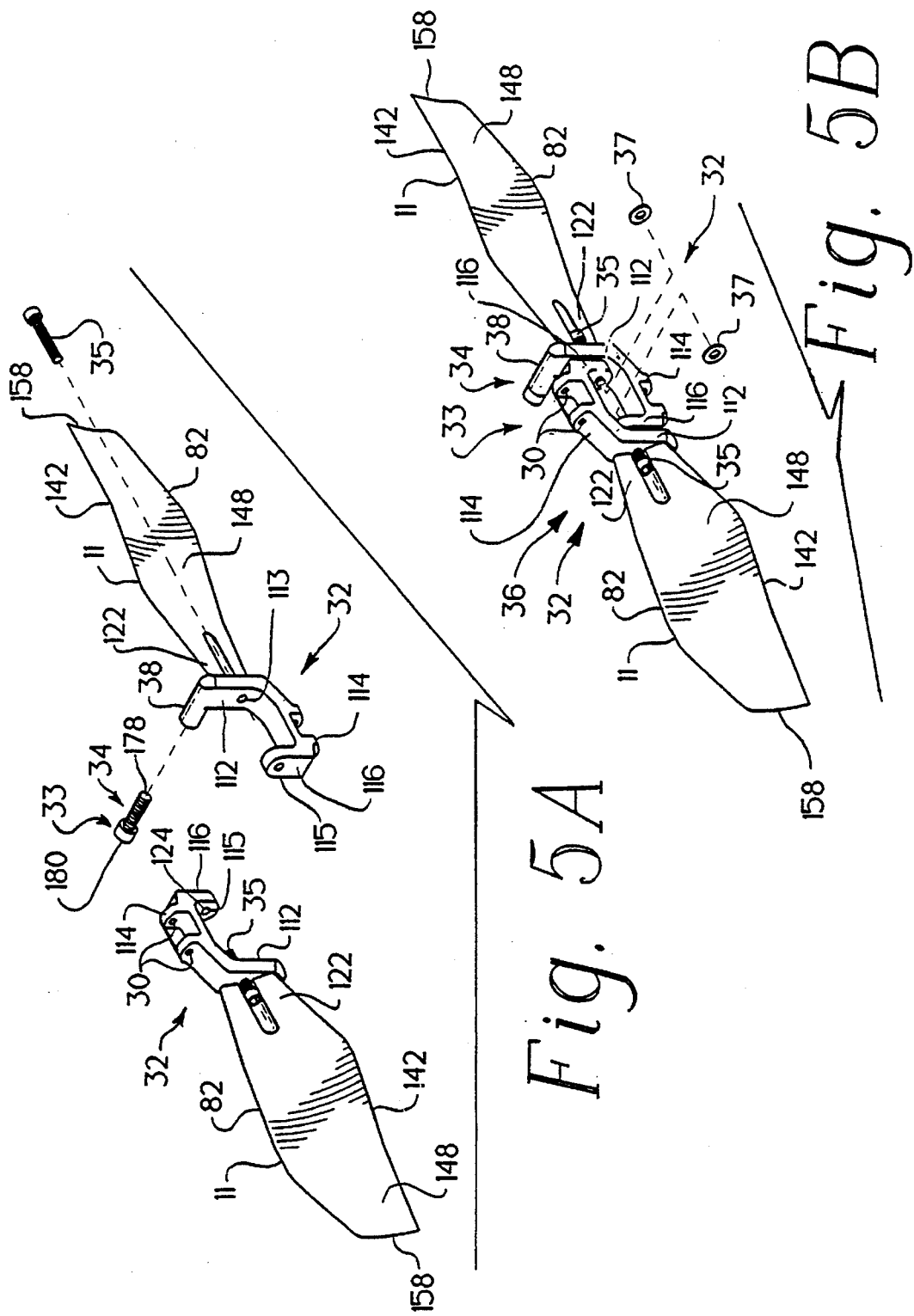
FIGS. 5A and 5B are detailed perspective views of the primary tail rotor blades and tail rotor blade grips in accordance with the present invention prior to assembly (FIG. 5A) and partially assembled (FIG. 5B), with all other parts of the tail rotor assembly omitted for clarity.

To develop a detailed understanding of the present invention, it is easiest to view isolated elements of the invention separated from the whole mechanism. Referring to FIGS. 5A and 5B, in the preferred embodiment of the present invention, tail rotor blades 11 are fixedly secured to reach-around blade grips 32 which also support timing weight bolts 34. Tail rotor blade assembly 36 shown in FIG. 5B comprises two opposing tail rotor blades 11 pivotable about tail rotor blade pivot bolts 35 extending through reach-around grips 32 at the base or blade root 122 of each tail rotor blade 11 and through the reach-around blade grip 32 of the opposing tail rotor blade 11. Tail rotor blades 11 include said blade root 122 situated adjacent to the rotor hub 39 and an outer edge 158 spaced apart from the blade root 122 as shown, for example, in FIGS. 5A, 5B and 11A. Thrust washers 37 abut the inner faces of reach-around grips 32 and are manufactured of a low friction material such as Teflon.

As shown, for example, in FIGS. 5A, 5B, 6, 11A, 17A and 17B, reach-around grips 32, 101 are C-shaped and include a base portion 112 connected to a tail rotor blade 11, a thrust-bearing portion 116, and a connecting portion 114 situated between base portion 112 and thrust-bearing portion 116. As shown in the assembly sequence of FIG. 6, thrust-bearing portions 116 of each reach-around grip 32 include a blade grip-bearing surface 124 which abuts a rotor hub-bearing surface 126 of tail rotor hub 39 opposite to the tail rotor blade 11 connected to the respective reach-around grip 32. Reach-around grips 32 are formed to include blade grip holes including a base pivot hole 113 formed in base portion 112 and a thrust pivot hole 115 formed in thrust-bearing portion 116. Reach-around grips 32 are assembled to tail rotor hub 39 by inserting pivot bolts 35 through base pivot holes 113 and thrust pivot hole 115 into tail rotor hub 39. Each pivot bolt 35 extends through base pivot hole 113 of one reach-around grip 32 and through thrust pivot hole 115 of the other reach-around grip 32 as shown, for example, in FIGS. 5A, 5B, and 6.

Figure 6:
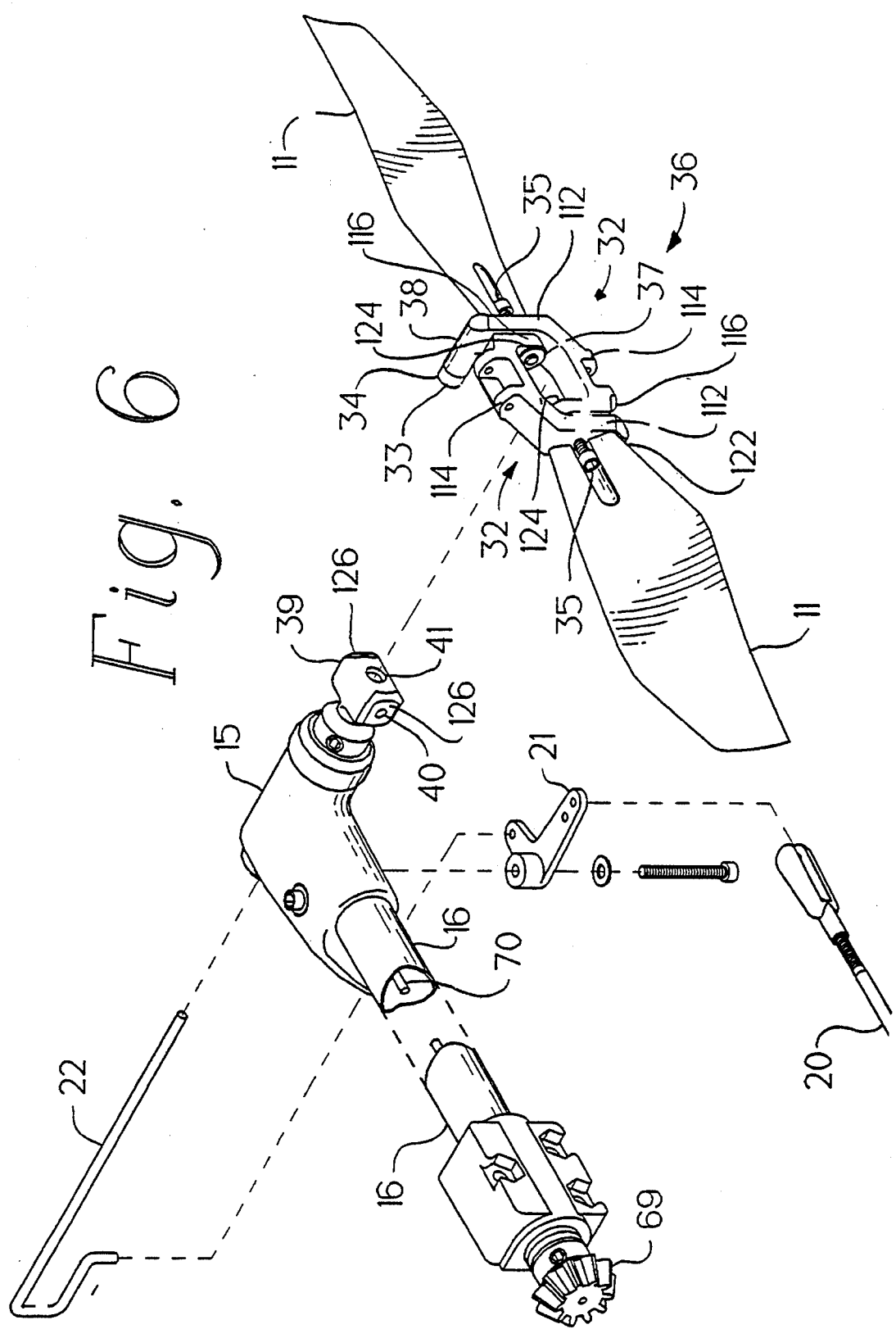
FIG. 6 is a detailed perspective view of tail rotor drive and control elements, and partially assembled tail rotor blades of the current invention, with the tail boom shown in cutaway and all other parts of the tail rotor assembly omitted for clarity.

In FIG. 6 which shows certain tail rotor elements before assembly, tail rotor pushrod 20 extends rearward along tail boom 16 from the pilot controls of helicopter 10 and is operably connected to bellcrank 21. Push-pull rod 22 is also operably connected to bellcrank 21 and extends transversely through the interior of gearbox 15 and tail rotor hub 39 to exit tail rotor hub 39 through hole 41. Tail rotor assembly 36 is operably connected to tail rotor hub 39 by tail rotor blade pivot bolts 35 which extend into hub pivot holes 40 located on opposite faces of tail rotor hub 39. A power transmission system is provided having bevel gear 69 fixedly connected to drive shaft 70 located within tail boom 16 to transmit power from engine 3 to tail rotor 2. In the preferred embodiment, tail rotor 2 is driven at a rotational speed 2 to 3 times that of main rotor 1. Higher speed ratios will increase the thrust and gyroscopic effectiveness of the present invention at the cost of increased power consumption.

Figure 7:
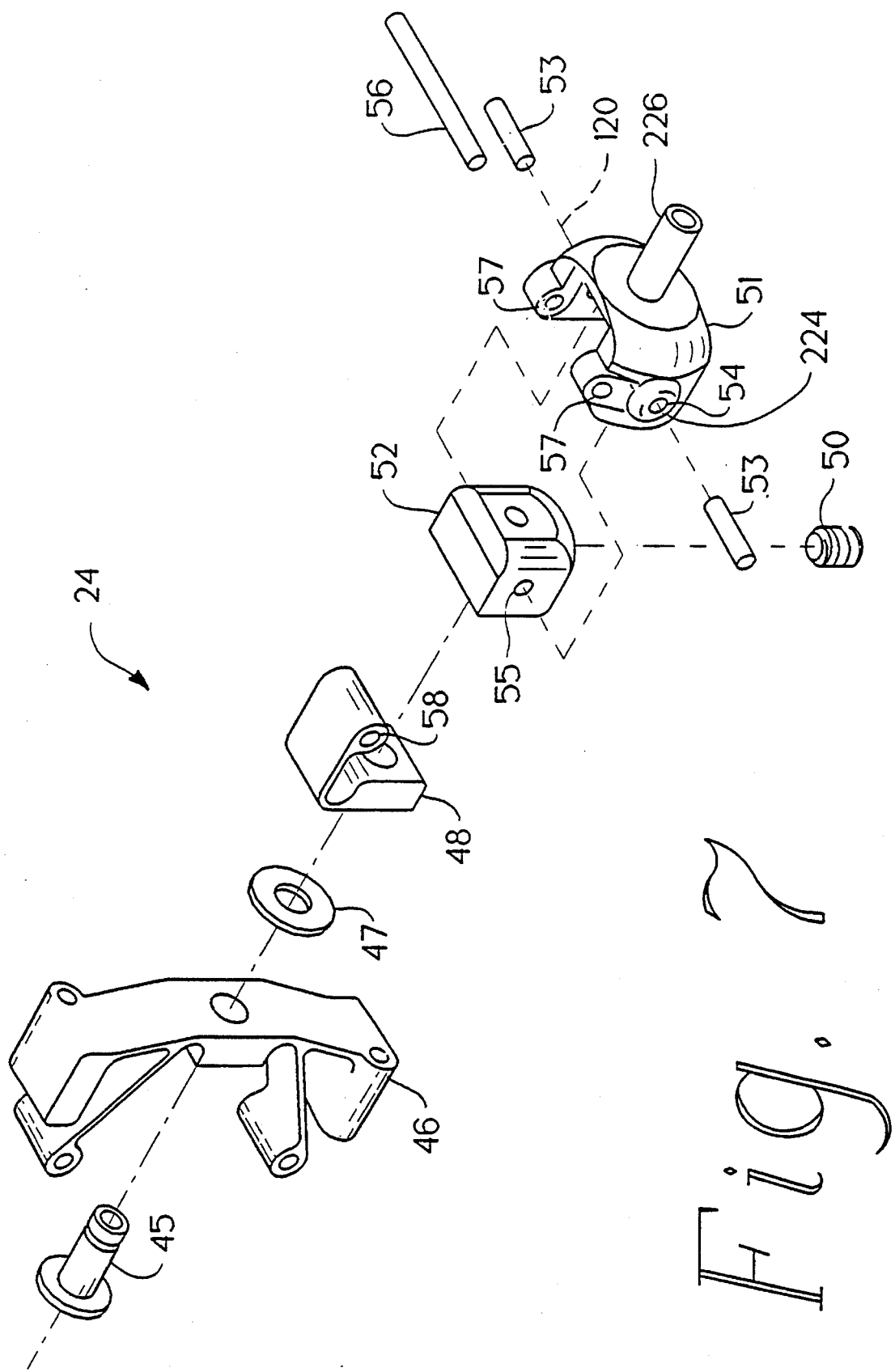
FIG. 7 is an exploded perspective view of tail rotor and gyro control elements including tail rotor pitch linkages in accordance with the present invention, with all other parts of the tail rotor assembly omitted for clarity.

Now referring to FIG. 7, tail rotor pitch linkages 24 (shown in FIG. 3) comprise slider eyelet 45, spider 46, spider separator washer 47, and spider slider 48. Spider eyelet 45 extends through spider 46 and is forcibly pressed into spider slider 48 thereby securing spider 46 and spider separator washer 47 for rotation against spider slider 48. Gyro spindle 51 is pivotably supported on gyro mount 52 by gyro pivot pins 53 which pass through spindle pivot holes 54 and are pressed into gyro mount pin holes 55 formed in opposing faces of gyro mount 52. Spider slider 48 is operably connected to gyro spindle 51 by slider link pin 56 which extends through spindle link holes 57 and is held within slightly undersized slider link hole 58. Gyro mounting screw 50 is provided to secure gyro mount 52 to the end of push-pull rod 22 (shown in FIG. 6).

In the preferred embodiment of the present invention, gyro spindle 51 is made of an aluminum alloy and is hard-coat anodized to provide a good wear surface for gyro assembly 12. Spindle pivot holes 54 and spindle link holes 57 are formed of, or lined with, a wear and vibration resistant material such as nylon.

Moving on to FIG. 8, which is an exploded view of gyroscopic assembly 12, shanks 220 of gyro arms 59, 67 extend through first and second shank-receiving apertures 252, 256 formed in the shoulders 234, 242 of gyro hub 62 and grip through-holes or passage 64 formed in delta-drive grips 60, 71. Gyro arms 59, 67 are fixedly secured to delta-drive grips 60, 71 and thereby secured for rotation relative to gyro hub 62. Delta-drive bars 61, 73 operate within drive bar holes 66 and are thereby pivotably connected to delta-drive grips 60, 71. In the preferred embodiment of the present invention delta drive angle 65 is 62.6 degrees so that a 15 degree tilt of gyroscopic assembly 12 results in approximately a 12 degree change in pitch of gyro paddles 218.

Delta-drive components are so-named because delta drive angle 65 couples the tilt of gyroscopic assembly 12 to the pitching motion of gyro paddles 218 in a manner conceptually similar to delta hinges on a main rotor (helicopter rotor hinge-axes are generally referred to with the Greek letters Alpha, Beta, Gamma and Delta). While the definition of a delta hinge on a rotor is widely known, the concept of coupling gyro tilt with gyro paddle pitch, and the mechanism for doing so, is entirely novel and disclosed herein for the first time. This concept is also a key distinction between the current invention and that disclosed in the Arlton '968 patent which used springs to restore the weighted arms of the gyro rotor to a nominal orientation.

Aerodynamic centering using gyro paddles 218 is especially useful in applications where the tail rotor (and consequently the gyro assembly) must operate throughout a wide range of rotational speeds. While return-springs always produce the same restoring force regardless of tail rotor rotational speed, gyroscopic forces causing a gyroscopic assembly to tilt and aerodynamic forces produced by cyclically pitching paddles are directly proportional to rotational speed. As a result, gyro paddles 218 produce restoring forces of the same magnitude as the gyroscopic tilting forces felt by gyroscopic assembly 12. This means that the time-response and overall effectiveness of the entire stabilization system is essentially invariant even though tail rotor rotational speed may be constantly changing.

Figure 9:
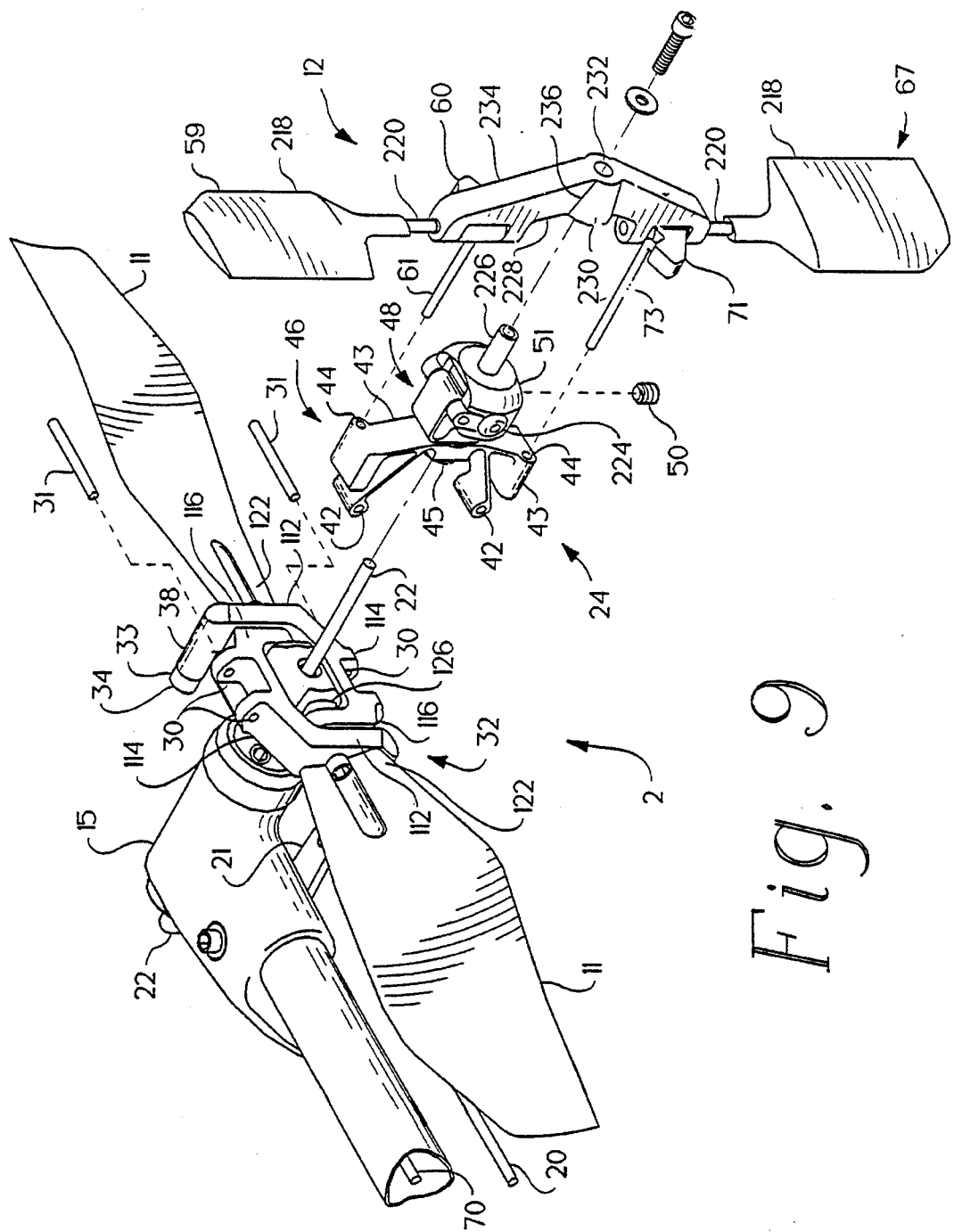
FIG. 9 is a perspective view of tail rotor sub-assemblies in accordance with the present invention showing relative positions of the tail rotor gearbox, tail rotor blades, pitch linkages, and gyro rotor elements.

As illustrated by FIG. 9, gyroscopic assembly 12 is supported for rotation on gyro spindle 51. Delta-drive bars 61, 73 extend through and are slidably supported within spider drive holes 44 in spider drive arms 43 of spider 46. Push-pull rod 22 extends through the center of slider eyelet 45 and is fixedly secured to gyro mount 52 by means of gyro mounting screw 50. Blade pitch pins 31 extend through pitch pin holes 30 in reach-around grips 32, and are pressed into spider pitch pin holes 42 in spider 46.

The support mechanism 214 of gyroscopic assembly 12 includes a gyro mount 52, a gyro spindle 51, and a gyro hub 62 as shown, for example, in FIGS. 2–4 and 7. Gyro mount 52 is coupled to a push-pull rod 22 to move therewith as shown, for example, in FIGS. 3 and 4. Gyro spindle 51 includes a base 224 coupled to gyro mount 52 for tilting or pivoting movement about gyro pivot axis 120 and a hub axle 226 appended to base 224 and arranged to extend away from tail rotor blades 11 as shown, for example, in FIGS. 7 and 9.

Gyro hub 62 is mounted on hub axle 226 for rotation about a gyro axis of rotation 134 relative to gyro mount 52 and gyro spindle 51 as shown, for example, in FIGS. 3, 4, and 9. Gyro hub 62 includes a central notch 228 sized to receive gyro mount 52 and gyro spindle 51 therein, a hub axle mount 230 formed to include a hub axle-receiving aperture 232 sized to receive hub axle 226 of gyro spindle 51, a first hub shoulder 234 having a first end 236 appended to hub axle mount 230 and a second end 238 spaced apart from first end 236 and formed to include a first gyro arm support 240, and a second hub shoulder 242 having a first end 244 appended to hub axle mount 230 and a second end 246 spaced apart from first end 244 and formed to include a second gyro arm support 248 as shown, for example, in FIGS. 3, 4, and 8.

Gyro arm supports 240, 248 are configured to support gyro arms 59, 67 for rotation about gyro rotor axis of rotation 34 as shown, for example, in FIGS. 3, 4, 8, and 9. Each gyro arm support 240, 248 includes a first finger 250 formed to include a first shank-receiving aperture 252 and a second finger 254 formed to include a second shank-receiving aperture 56. The second finger 254 is situated to lie in spaced-apart relation to first finger 250 to define a gyro arm grip-receiving space 258 therebetween as shown, for example, in FIGS. 3, 4, 8, and 9.

The pitch adjustor linkage 216 includes first and second gyro arm grips 60, 71 and first and second drive bars 61, 73 as shown, for example, in FIGS. 3, 4, and 8. Each gyro arm grip 60, 71 includes a sleeve 260 formed to include passage 64 sized to receive shank 220 of gyro arm 59, 67 in a fixed position therein and a drive bar anchor 264 appended to sleeve 260 as shown, for example, in FIGS. 3, 4, and 8. Each sleeve 260 is positioned to lie in gyro arm grip-receiving space 258 formed between first and second fingers 250, 254 on first and second hub shoulders 234, 242 as shown, for example, in FIGS. 3, 4, and 8. The sleeves 260 rotate relative to gyro hub 62 about gyro arm pitch axes 210, 212 as gyro arms 59, 67 tilt about gyro pivot axis 120 as shown, for example, in FIGS. 3 and 4. When sleeves 260 rotate relative to gyro hub 62, gyro arms 59, 67 rotate about gyro arm pitch axes 210, 212 to change the pitch of gyro arms 59, 67 as shown, for example, in FIGS. 3 and 4.

Drive bars 61, 73 each include a first portion 266 fixed to drive bar anchor 264 and a second portion 268 slidably engaging an aperture 44 formed in a spider 46 as shown, for example, in FIGS. 3, 4, 8, and 9. Spider 46 is one of several tail rotor pitch linkages 24 as shown, for example, in FIGS. 3 and 4. The second portion 268 of drive bars 61, 73 translates back and forth through apertures 44 when gyro arms 59, 67 tilt about gyro pivot axis 120. A delta drive angle or included angle 65 is formed between first portion 266 of drive bar 61 and gyro arm pitch axis 210 and first portion 266 of drive bar 73 and gyro arm pitch axis 212 as shown, for example, in FIG. 8. Due to delta drive angle 65, sleeves 260 of gyro arm grips 60, 71 rotate about gyro arm pitch axes 210, 212 to change the pitch of gyro arms 59, 67 as gyro arms 59, 67 tilt about gyro pivot axis 120 relative to drive bars 61, 73 and drive bars 61, 73 translate through apertures 44 formed in spider 46 as shown, for example in FIGS. 3 and 4. In general, delta drive angle 65 causes the gyro arms 59, 67 to pitch as gyro arms 59, 67 tilt about gyro pivot axis 120 relative to drive bars 61, 73.

An important design consideration when using mechanical yaw stabilizer systems is the force required to actuate tail rotor blades 11. The actuating power of a mechanical gyro stabilizer is determined by the rotational speed, size, and mass of the gyro rotor (e.g., gyroscopic assembly). Given a particular tail rotor rotational speed, high actuation forces necessitate large and/or heavy gyro rotors. Rotor blade actuation forces, therefore, must be kept low to minimize the size and weight of the gyro rotor.

In light man-carrying helicopters the mechanical force required to actuate (e.g., change the collective pitch) tail-rotor blades 11 is produced by the pilot's legs pushing against foot peddles. In heavier helicopters, bearing friction and aerodynamic forces developed by the tail-rotor blades can be too high for the pilot to overcome. Heavy helicopters, therefore, are frequently fitted with power-assist devices such as hydraulic systems to boost the pilot's controls. The weight of power-assist devices is roughly proportional to the forces they must develop. In all helicopters, minimizing control loads is desirable since pilot work load, linkage forces, and actuator weight can all be reduced.

Figure 10A:
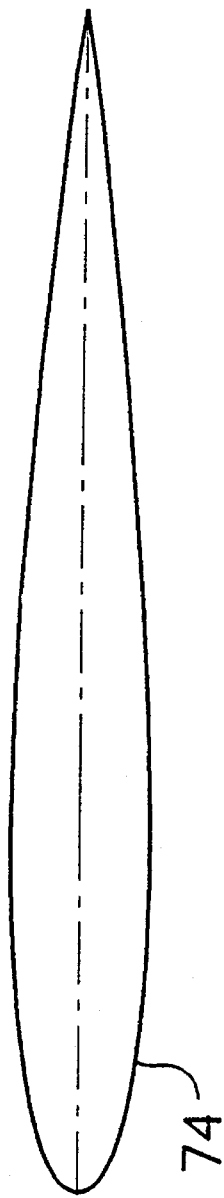
FIGS. 10A and 10B show a comparison view of a symmetrical airfoil section and an undercambered airfoil section.

For reasons of structure and simplicity, and to minimize actuation forces, helicopter tail rotor blades have traditionally employed symmetrical airfoils such as section 74 shown in FIG. 10A, and simple constant chord (rectangular) planforms. While easy to build, these rotors do not use power very efficiently. Since helicopters have relatively low payload capacities, even small increases in rotor performance can result in large percent changes in payload capability.

Figure 10B:
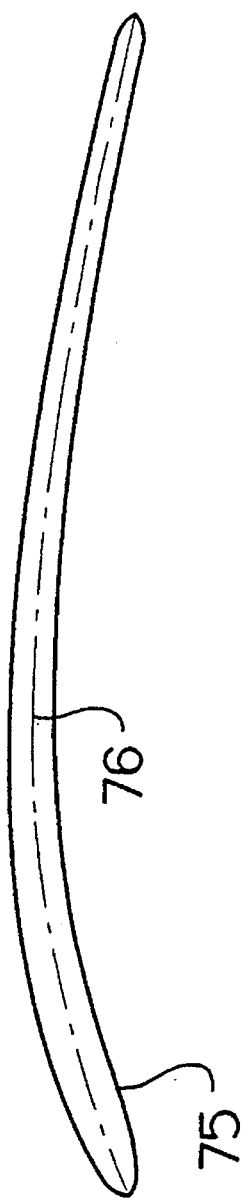

Cambered airfoils, such as airfoil 75 with curved camber line 76, shown in FIG. 10B, can substantially increase the lifting potential of a rotor blade. Cambered airfoils, however, have a drawback: the curvature of the airfoil causes the airfoil to pitch downward toward negative angles of attack. This pitching tendency can cause the rotor blade to twist and to exert high loads on the rotor pitch control linkages (and consequently to the pilot's legs).

One tail rotor design successfully employing cambered airfoils is described in a technical paper entitled "Increasing Tail Rotor Thrust and Comments on Other Yaw Control Devices" by Frank Robinson published in the Journal of the American Helicopter Society in 1970. In this design, centrifugal force acting through the blade center-of-gravity balances the unwanted steady-state aerodynamic forces of the cambered airfoil. A disadvantage of Robinson's approach is the need to control blade chordwise center-of-gravity. Some blade manufacturing techniques such as plastic injection molding are not well suited to this restriction.

Tail rotor blade 11 of the present invention balances the aerodynamic moment of a cambered airfoil with other forces, and does not require chordwise control of the blade center-of-gravity, or place restrictions on blade coning or flapping. Tail rotor blade 11 balances the pitching moment of the cambered airfoil with a positive aerodynamic lift force located in front of blade pitching axis 81. Tail rotor power requirements and pilot workload are both reduced through the use of cambered airfoils and balanced aerodynamic and centrifugal forces.

A blade center-of-pressure line 84 is shown in FIG. 11A connecting the 25% chord positions of each spanwise station of tail rotor blade 11 between blade root 122 and outer edge 158. As is well known to those skilled in the art, the aerodynamic center (also called center-of-pressure) of a conventional airfoiled cross-section is generally located at a chordwise position 25% of the chord length behind the leading edge 82 of the airfoiled cross section regardless of the shape of the airfoiled cross section. Center-of-pressure line 84, therefore, represents the aerodynamic centers of all airfoiled cross sections of tail rotor blade 11. It can be seen from FIG. 11A that the 25% chord positions of each spanwise station of tail rotor blade 11 lie between pitch axis 81 and leading edge 82, so the overall aerodynamic center-of-pressure 80 of tail rotor blade 11 lies between pitch axis 81 and leading edge 82.

To understand the operational details of tail rotor blade 11, it is easiest to develop the blade shape in steps. The planform of tail rotor blade 11 shown in FIG. 11A can be generated from a standard, rectangular planform by performing a number of design modifications. Blade leading edge 82 is swept forward in rotation direction 13 in order to position blade center-of-pressure 80 (where all aerodynamic lift forces are assumed to be concentrated) ahead of pitch axis 81. Blade thrust forces acting through offset center-of-pressure 80 tend to oppose the nose-down pitching moment of the cambered airfoil sections as long as the airfoil sections are operating at a positive angle-of-attack. These thrust forces, which increase with increased angle-of-attack, can also help to offset the natural mass-feathering (or "tennis racquet") effect which is well known to those skilled in the art to which the present invention relates.

Without further modification, tail rotor blade 11 could exhibit pitch divergence (angle-of-attack instability) and tend to flutter or transition rapidly between positive and negative pitch. To reduce the potential for flutter, blade tip 83 (after approximately the 70% semi-span location) is swept back. This swept tip may also be advantageous on blades with tips designed to operate at high Mach numbers (as will be understood by one skilled in the art). Blade tip 83 is tapered and the entire blade is twisted linearly eight to ten degrees to reduce induced drag.

FIG. 11F shows that a conventional straight tail rotor blade 87 can be modified to move the blade center pressure forward by adding a leading-edge cuff 88.

Since the aerodynamic force acting on center-of-pressure 80 is actually the lift force produced by tail rotor blade 11, and since lift is proportional to angle-of-attack, the force opposing the airfoil pitching moment is dependent upon blade angle-of-attack. Small balancing weights 33 are added to blade grips 32 to balance blade pitching forces throughout a large angle-of-attack range. Balancing weights include timing weight bolts 34 situated in a weight-holding portion 38 of reach-around grips 32 as shown, for example, in FIGS. 3, 4, 5A, 5B 6 and 9. Actual sizing and location of balancing weights 33 is dependent upon the construction and mass distribution of tail rotor blades 11.

Figure 13:
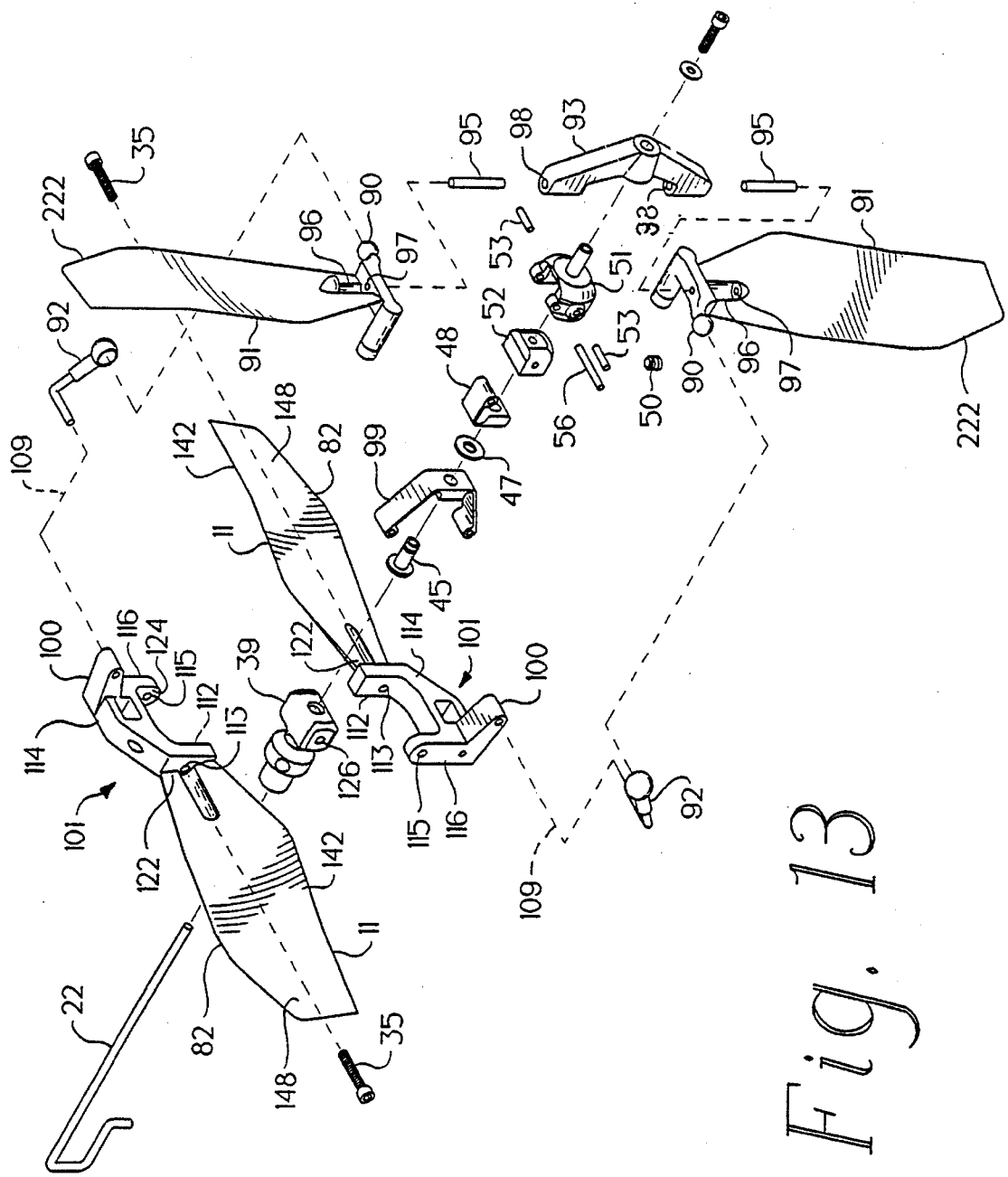
FIG. 13 is an exploded view of the yaw control and stability system shown in FIG. 12 showing the details of each element.
Figure 14:
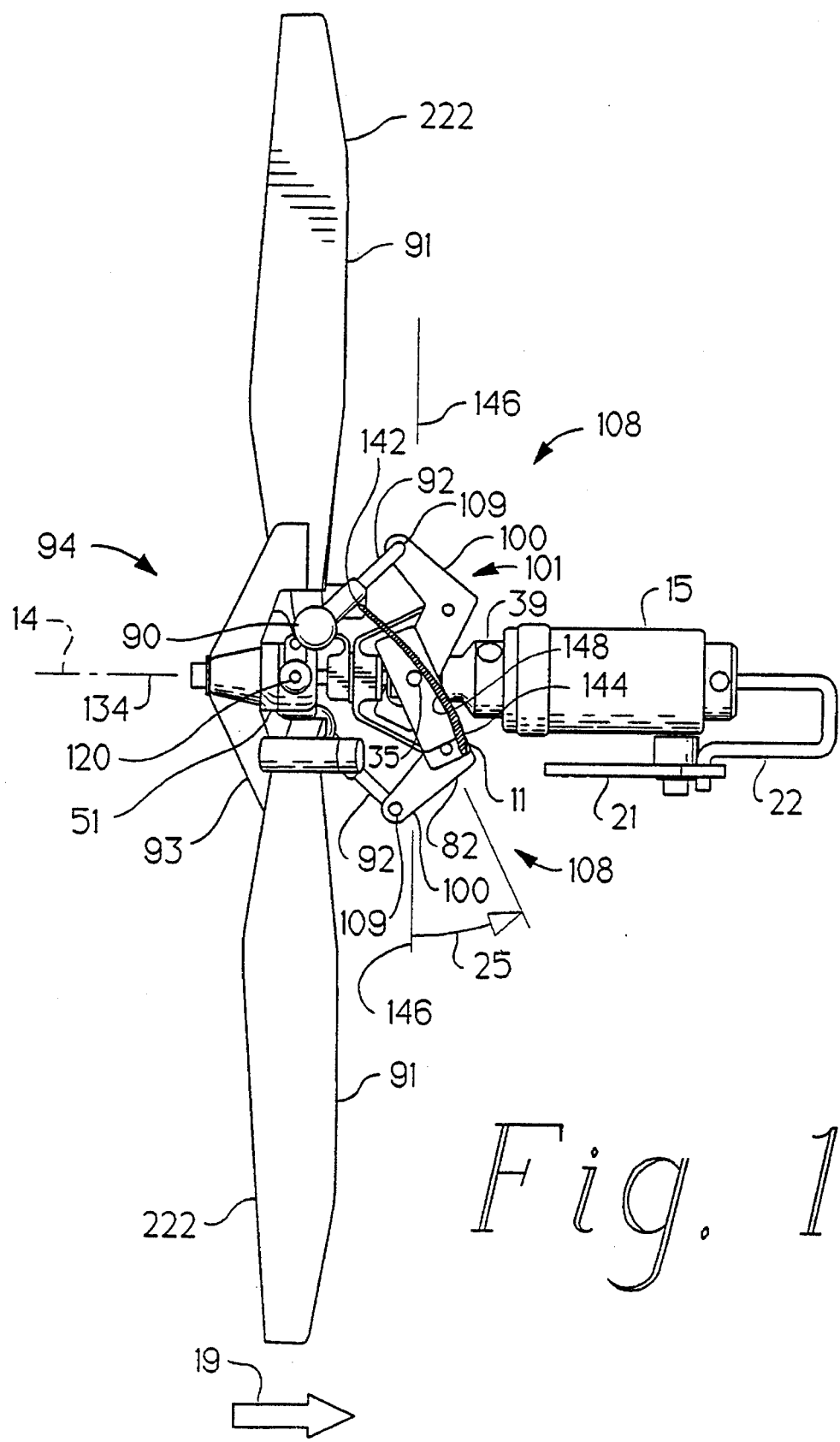
FIG. 14 is a rear-end elevation view of the helicopter tail assembly shown in FIG. 13 (viewed from the rear of the helicopter toward the fuselage) fitted with the additional tail rotor blades shown in FIGS. 12 and 13 and a fully collective-pitch gyro rotor and showing the effect of pilot control input on all tail rotor blades, with one tail rotor blade shown in cross section and all details ahead of the tail rotor gearbox omitted for clarity.
Figure 15:
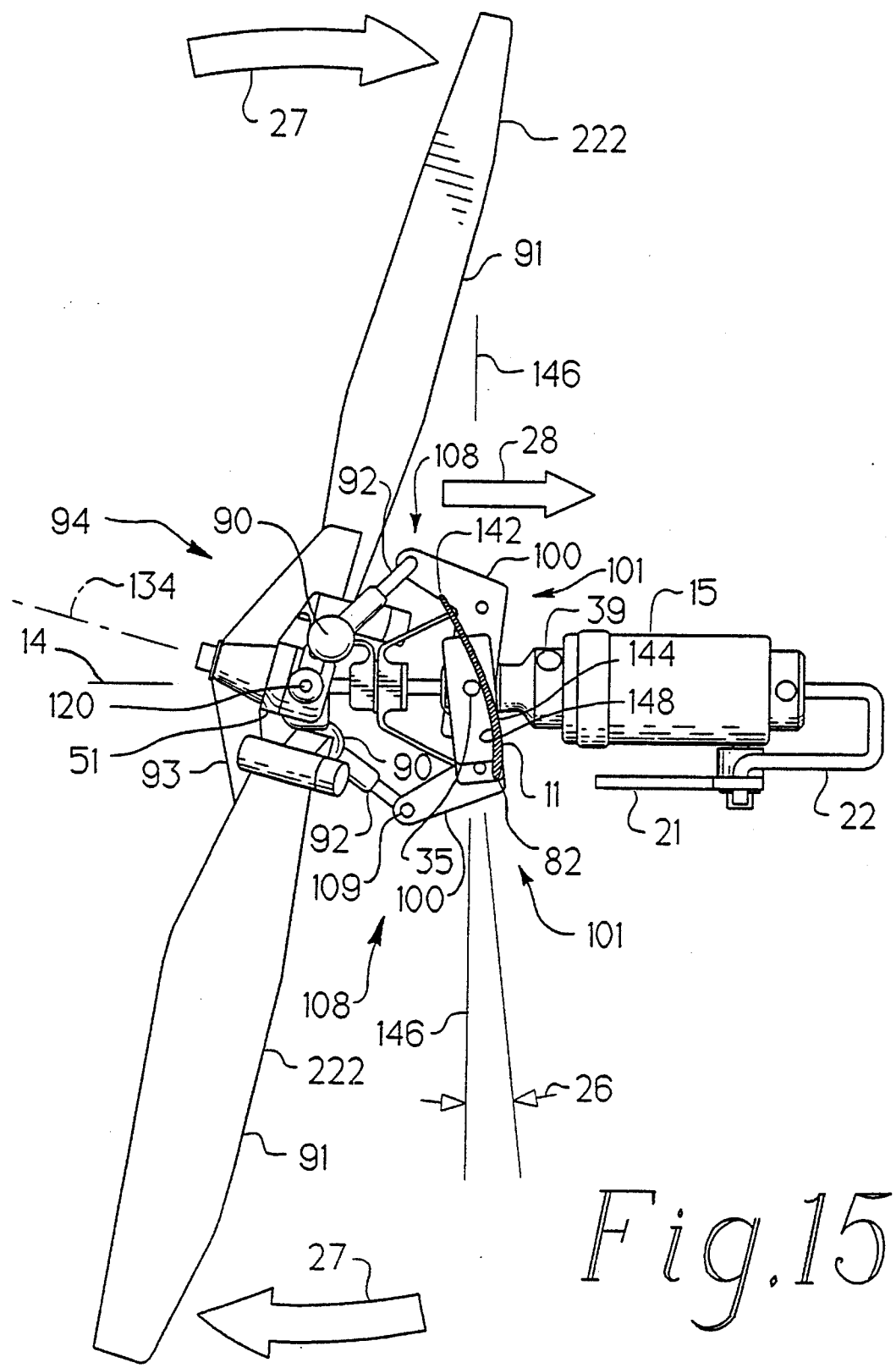
FIG. 15 is a view similar to FIG. 14 showing reaction (e.g., change in pitch or angle-of-attack) to yaw motion of the helicopter of one of the tail rotor blades (shown in cross section) and also of the two rotor blades included in the gyroscopic assembly slidably mounted on an outboard end of the tail rotor assembly invention.

As shown, for example, in FIGS. 3, 4, 5A, 5B, 6, and 9, timing weight bolt 34 engages weight-holding portion 38 of reach-around grip 32 and thus is operably connected to tail rotor blade 11. Timing weight bolt 34 is situated offset from the upper-surface side 144 and the lower-surface side 148 toward the trailing edge 142 of tail rotor blade 11 as shown in FIGS. 3 and 4. The rotor blade 11 includes a plane 176 extending substantially perpendicular to the lower-surface side 148 and the upper-surface side 144 and extending through the rotor blade pitching-axis 81 and the timing weight bolt 34 is offset from the plane 176 as shown in FIG. 11A. FIGS. 13–15 show tail rotor blade 11 connected to C-shaped reach-around grip 101 having grip drive arm 100 situated offset from a tail rotor plane of rotation 146 toward the blade leading edge 82 of tail rotor blade 11 on the lower-surface side 148 of tail rotor blade 11.

Timing weight bolt 34 swings radially outward from tail rotor axis 14 when tail rotor blade 11 pitches to a higher pitch angle, shown in FIG. 3, and inward toward tail rotor axis 14 when tail rotor blade 11 pitches to a lower pitch angle, shown in FIG. 4. Timing weight bolt 334 includes a head 180 and a threaded shaft 178 as shown in FIG. 5A.

Tail rotor blade 11 need not be fixedly secured to reach-around grips 32, and such grips need not be of the reach-around variety. As an alternative embodiment of the present invention, tail rotor blades 11 can be hinged at the root to lead or lag with blade center of gravity 29 being so placed as to induce tail rotor blade 11 to fly in the desired orientation when rotating at flight speed. In addition, standard tail rotor blade grips having multiple ball bearings can be substituted for reach-around grips 32, but at additional cost.

Note that blade cross sections need not be undercambered to benefit from the force balancing method of the present invention. The blade configuration of the present invention can also be used to balance the mass-feathering ("tennis-racquet") forces felt by blades with symmetrical airfoils, and can also be used on rotor systems other than tail rotors such as main rotor systems with undercambered airfoils.

The airfoils shown in FIG. 11A through 11E are meant for use on very small model helicopters operating at Reynolds numbers below 50,000 (as would be understood to one skilled in the art). The cross sections labeled as FIG. 11B through 11E are 15%, 4.7%, 4.6% and 6.8% thick respectively (measured as a percentage of chord), and pitched to 20 deg., 17 deg., 13 deg., and 10 deg. respectively (measured from the horizontal). Airfoils meant for larger applications should be selected on the basis of the particular Mach and Reynolds numbers associated with the application (as would be familiar to one skilled in the art).

The outer edge 158 is located a predetermined distance along the blade-pitching axis 81 from tail rotor axis of rotation 14 and defines a 100% semi-span location as shown in FIG. 11A. A particular semi-span location is denoted as the percentage of the distance along the blade-pitching axis 81 from the tail rotor axis of rotation 14 to the outer edge 158. As measured from FIG. 11A, the airfoiled cross sections of FIGS. 11B, 11C, 11D and 11E are located at approximately 16%, 40%, 70%, and 100% semi-span locations, respectively, of tail rotor blade 11 as shown, for example, in FIG. 11A. The 100%, 70%, 40%, and 16% semi-span locations include first, second, third, and fourth chord lengths, 160, 162, 164, 166 respectively, and first, second, third, and fourth thicknesses, respectively, 168, 170, 172, 174 as shown, for example, in FIGS. 11B–11E. Also as measured from FIG. 11A, the surface area of tail rotor blade 11 lying ahead of pitch axis 81 between sections lib and 11C is about 41% of the total surface area between those two sections 11B, 11C. Similarly, approximately 47% of the surface area of tail rotor blade 11 between sections 11C and 11D lies ahead of pitching axis 81, approximately 54% of the surface area of tail rotor blade 11 between sections lid and lie lies ahead of pitching axis 81, and approximately 48% of the total surface area of tail rotor blade 11 between sections 11B and lie lies ahead of pitching axis 81. Blade center-of-pressure 80 is located at approximately the 70% semi-span location through which section 11d is taken. Blade center-of-pressure 80 is located forward of pitching axis 81 a distance 182 at the 70% semi-span airfoiled cross-section as shown in FIG. 11A. Distance 182 is approximately 28% of the chord length 162 of the 70% semi-span airfoiled cross-section. The aerodynamic center of pressure of the 100% semi-span location situated on blade center-of-pressure line 84 is located a distance 184 from the blade-pitching axis 81 as shown in FIG. 11A. Distance 182 is greater than distance 184.

Figure 16:
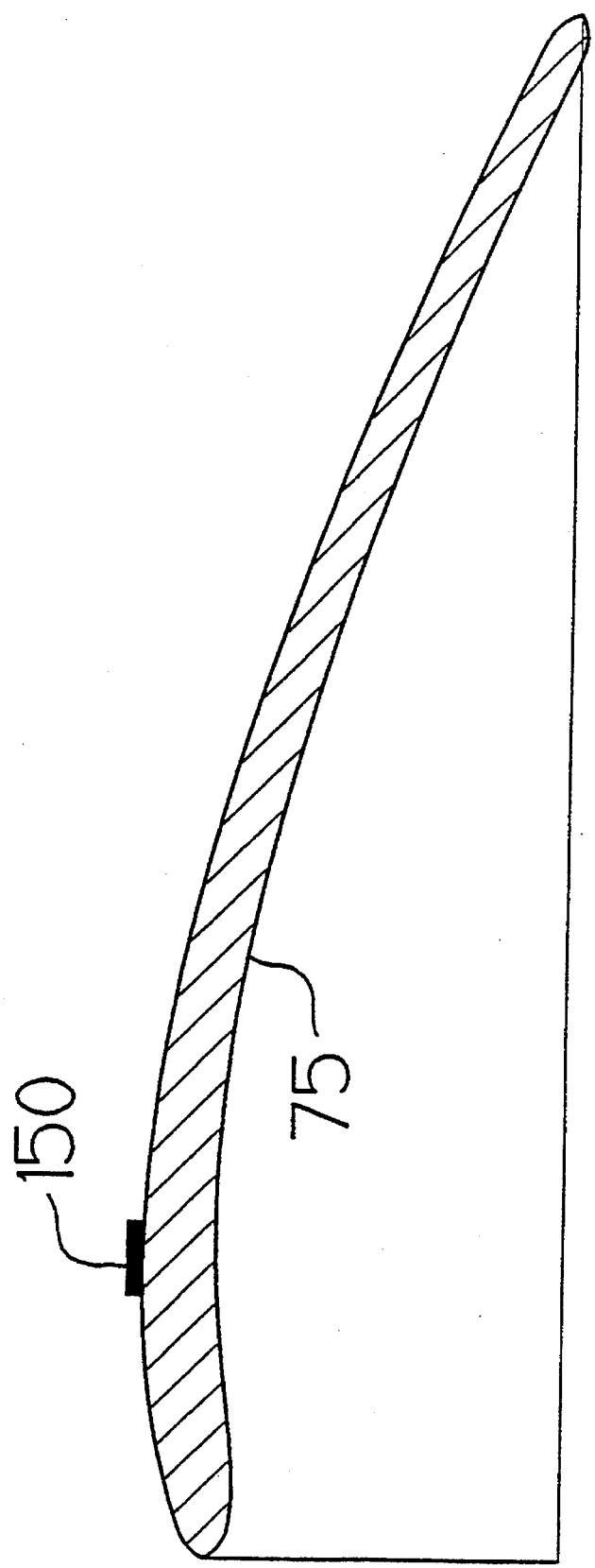
FIG. 16 shows a drag-reducing turbulator strip appended to the upper surface of an airfoil.

Thin airfoils such as those in FIG. 11C–E, and airfoils intended for use at low speeds (such as on very small helicopters) can benefit from turbulator strips such as turbulator 150 in FIG. 16 shown appended to the top surface of airfoil 75. Turbulators are thin, raised strips of material running spanwise near the leading edge of an airfoil (top and/or bottom) that induce the airflow over the surface of the airfoil to become turbulent and to stick more readily to the airfoil. Turbulators can reduce the drag produced by some airfoils operating at certain (especially low) speeds where the airflow tends to separate from the surface. Whereas turbulators have found applications on some fixed wing aircraft, turbulators on helicopter rotor blades are novel since most helicopters currently available utilize relatively large, high speed rotors where turbulators are not beneficial.

Figure 17A:
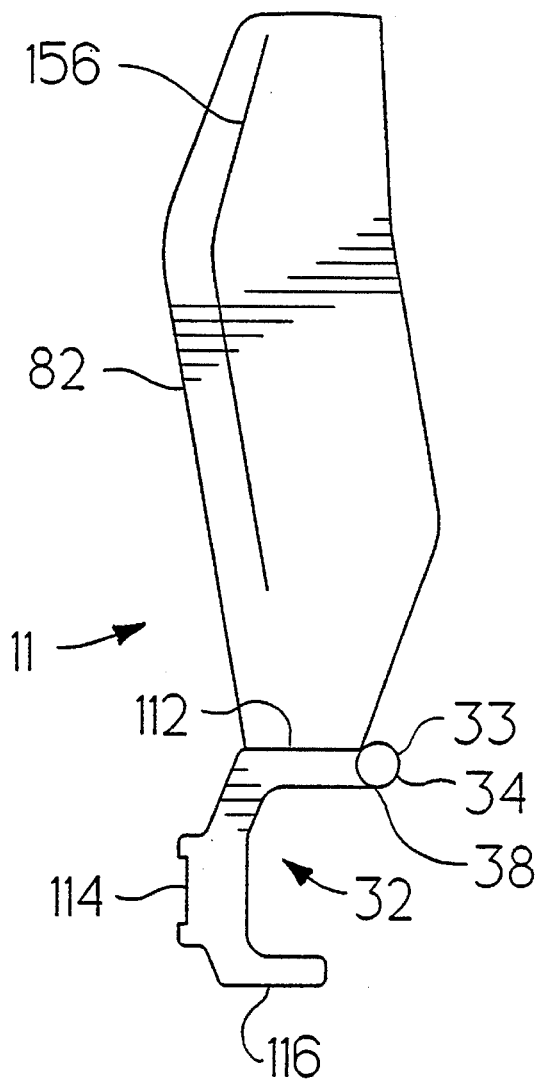
FIG. 17A and FIG. 17B are planform views of tail rotor blades showing various drag-reducing turbulator configurations appended near the leading edges of the blades.
Figure 17B:
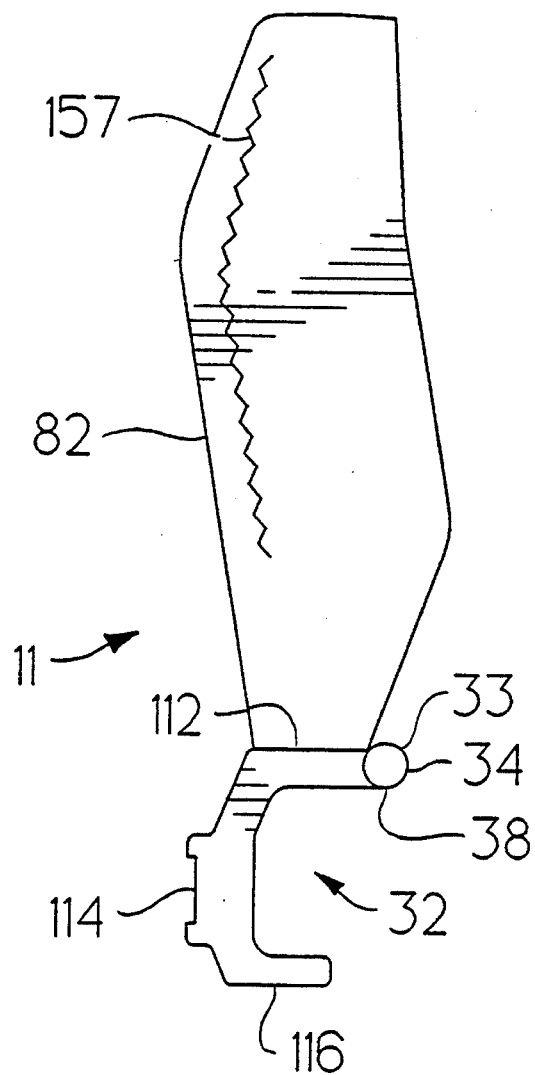

FIGS. 17A–C show various turbulator configurations on tail rotor blade 11. Straight turbulator 156 and zig-zag turbulator 157 are positioned approximately 10% to 20% back from leading edge 82 of tail rotor blade 11, are 1% in width, and 0.2% in height (where percentages refer to local airfoil chord length). The actual position of turbulators 156 and 157 depend upon the airfoils, operating angle of attack and operating speed of tail rotor blade 11.

Figures 18A, 18B:
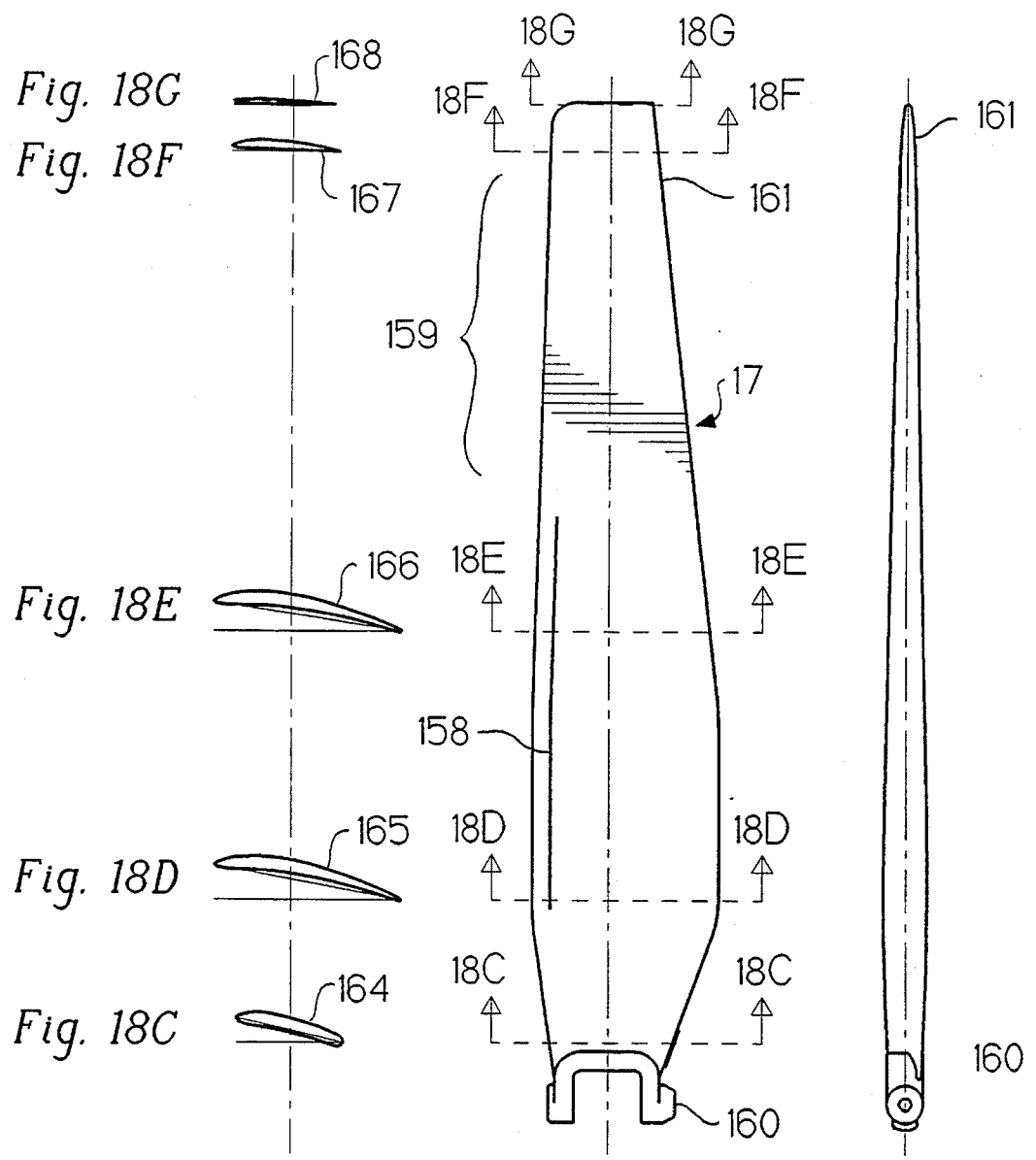
FIG. 18A and 18B show the top and rear views of a main rotor blade having airfoiled cross-sections shown as FIG. 18C through 18G, and a turbulator appended to the upper surface near the leading edge.

FIG. 18A and 18B show main rotor blade 17 with blade root 160 and blade tip 161. Various airfoiled cross-sections of blade 17 are shown in FIG. 18C through 18G at selected spanwise stations. Arlton, in U.S. application No. 08/233,159, disclosed airfoils for use on a main rotor blade on a helicopter. The preferred embodiment of the present invention advantageously employs selected airfoils and a turbulator strip to provide a superior rotor blade to operate with a tip Reynolds number of approximately 100,000 and above.

Airfoil section 164 is a thick section designed to connect blade root 160 and airfoil section 165. Illustratively, sections 165 and 166 are 7.1% thick Sokolov airfoils with 6% camber and turbulator strip 158 appended to the upper surface at the 10% chord location (as described by Dieter Althaus in his book "Profilpolaren Fur Den Modellflug" published by C. F. Muller in Germany). It will be understood that sections 165 and 166 can be other similar thin (4%–8%) sections developed for use at low Reynolds numbers, for example, below 60,000.

Turbulator 158 extends over the inboard portion of main rotor blade 17 where airflow tends to separate from the surface (since the inboard section of a rotating rotor blade travels more slowly than the outboard section). Outboard portion 159 of blade 17 is traveling at a higher speed, and has an airfoil section chosen to reduce the likelihood of airflow separation. In the preferred embodiment, rotor blade 17 is made of molded plastic and turbulator 158 is a molded detail of blade 17.

Section 166 transitions to section 167 in outboard region 159 of blade 17 where section 167 is illustratively a 9.2% thick SD7037-PT airfoil with 3% camber developed by Michael Selig et al. for use at low Reynolds numbers (described in Soar Tech 8 published by H. A. Stokely of Virginia Beach, Va., USA). It will be understood that section 167 can be another similar section developed for use in the low Reynolds number range of, for example, 50,000 to 100,000.

Section 167 transitions to section 168 which is a 4% to 9% thick airfoil with low camber for use as a low drag tip. The planform of rotor blade 17 is tapered, and the blade twisted (washed-out) 10 to 14 degrees from root to tip for higher aerodynamic efficiency.

In the preferred embodiment, tail rotor blades 11 for model helicopters are molded from plastic such as nylon, and in full-size helicopters can be molded with fiber composite skins such as Kelvin/carbon over a foam or honeycomb core and bonded with epoxy. Angled cross-fibers can be used to distribute torsional loads across the blade span.

Figure 12:
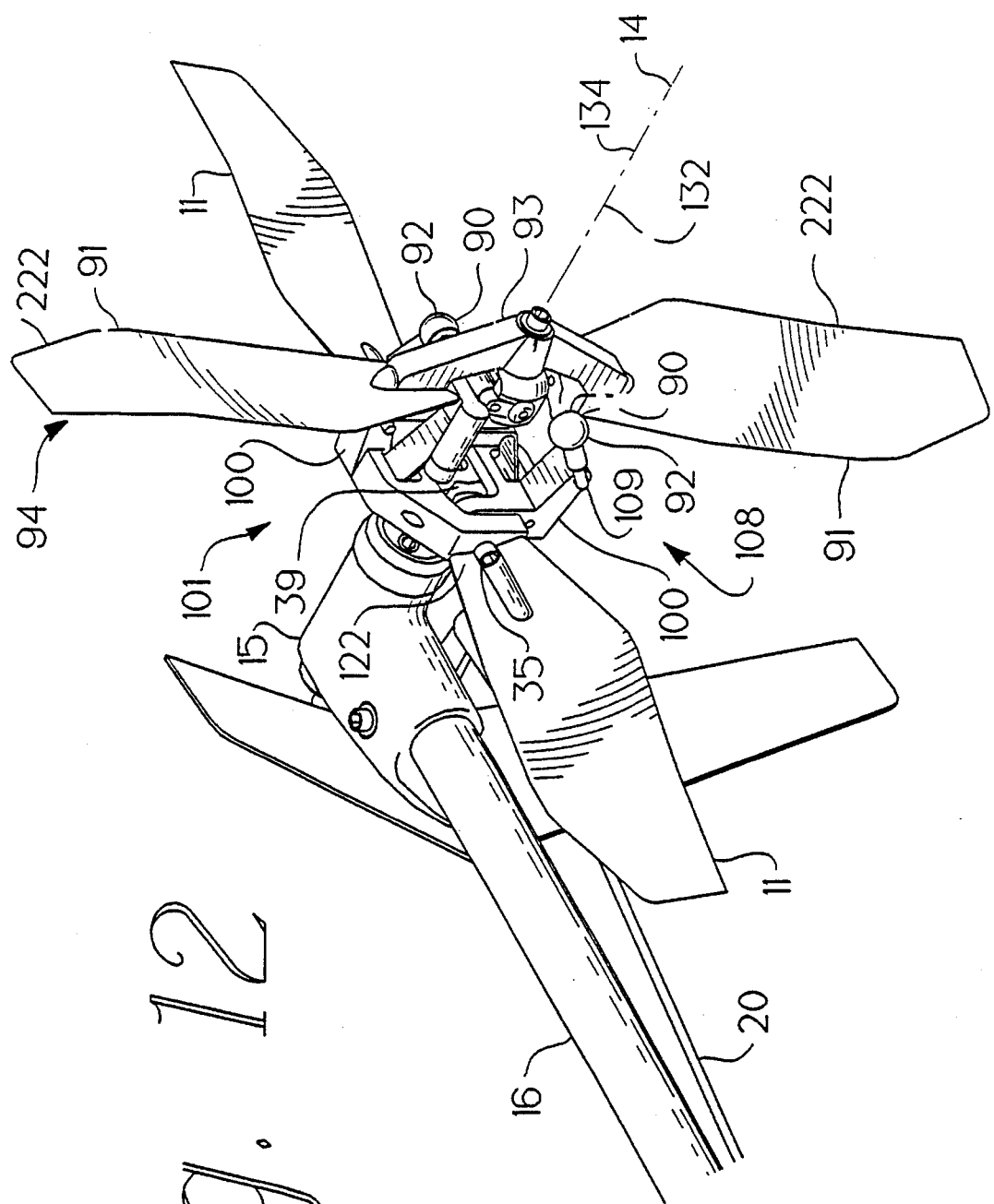
FIG. 12 is a perspective view of an alternative embodiment of a yaw control and stability system in accordance with the present invention showing a fully collective-pitch gyro rotor mounted on a helicopter tail rotor assembly and provided with rotor blades in place of gyro paddles of the type shown in FIGS. 1 and 2.

Many variations of the present invention are contemplated. FIGS. 12–14 describe an alternate embodiment with gyro rotor 94 having gyro rotor blades 91 in place of gyro paddles 59 and ball-drive links 92 in place of delta drive bars 61, 73. FIG. 12 is similar to FIG. 2 and shows the alternate tail rotor of helicopter 10. The primary differentiating features of this alternate embodiment are gyro rotor blades 91 which pitch collectively in unison with tail rotor blades 11, and thus form a secondary, thrust-producing rotor system.

It can be seen by examining FIG. 13, which is an exploded view of the embodiment shown in FIG. 12, that many elements of the present invention are unchanged in form and function in the alternate embodiment. Spider 99 is similar to spider 46 but without spider drive arms 43. Reach-around grips 101 have drive arms 100 receptive to ball-drive links 92. Gyro rotor hub 93 engages gyro rotor blades 91 in blade recesses 96 at the root of each gyro rotor blade 91. Gyro rotor blades 91 are pivotably secured to gyro rotor hub 93 by gyro pitch pins 95 extending through blade pin holes 97 at the root of gyro rotor blades 91 and through hub pin holes 98 in arms of gyro rotor hub 91.

Referring now to FIG. 14, which is similar to FIG. 3 and illustrates the effect of pilot tail rotor control inputs, gyroscopic assembly 94 and tail rotor blade pitch linkages 24 are operably mounted to, and move along with, push-pull rod 22. Gyro rotor 94 is driven by ball drive links 92 connected to grip drive arms 100. Operation of push-pull rod 22 in the direction of control input arrow 19 pitches tail rotor blade 11 to a higher angle-of-attack as shown by control pitch arrow 25. Simultaneously, grip drive arms 100 act upon ball-drive links 92 to pitch gyro rotor blades 91 collectively to a higher angle-of-attack. Both the primary tail rotor blades and the secondary gyro rotor blades thereby create useful thrust for maneuvering.

Proceeding to FIG. 15 which is a view similar to FIG. 4 illustrating the effect of yaw motion on gyroscopic assembly 94, yaw motion of helicopter 10 applies yaw forces to gyroscopic assembly 94 causing gyro rotor 94 to precess (tilt) in precession direction 27. Tilt of gyro rotor 94 causes tail rotor blades 11 to pitch to a new angle-of-attack as shown by stabilizing pitch arrow 26. Grip drive arms 100 act upon ball-drive links 92 to pitch gyro rotor blades 91 collectively to a new angle-of-attack. This new angle-of-attack of both primary and secondary rotor systems, and the associated change in thrust force, resists the initial yaw motion of helicopter 10. Because gyro drive balls 90 are offset slightly from the tilt axis or gyro pivot axis 120 of gyro rotor 94 (defined by gyro pins 53 shown in FIG. 7), gyro rotor blades 91 also pitch cyclically (twice per revolution) when gyro rotor 94 is tilted. The resulting aerodynamic moment restores gyro rotor 94 to a nominal vertical orientation.

As shown, for example, in FIGS. 12–15, reach-around grip 101, grip drive arm 100, and ball-drive link 92 form a scissors-type linkage 108. Reach-around grip 101 and grip drive arm 100 together form a first link pivotably connected to tail rotor hub 39 by tail rotor blade pivot bolts 35 and to drive link 92 at scissor pivot 109. Drive link 92 forms a second link connected to gyro rotor 94 at gyro drive ball 90.

Grip drive arms 100 and ball drive links 92 expand and contract relative to one another when gyroscopic mechanism 94 pivots to change the pitch of tail rotor blades 11 and gyro rotor blades 91 as shown in FIGS. 14 and 15. Grip drive arms 100 and ball drive links 92 continue to transfer rotational motion to gyroscopic mechanism 94 as grip drive arms 100 and ball drive links 92 expand and contract relative to each other. As can be seen best in FIGS. 14 and 15, scissor linkages 108 can convey rotational motion to gyro rotor 94 while gyro rotor 94 tilts about gyro pivot axis 120 and while the distance between gyro rotor 94 and tail rotor hub 39 changes.

Note that the thrust forces produced by gyro rotor blades 91 are transmitted to push-pull rod 22 and all associated tail rotor control linkages. Such linkages must therefore be designed to accommodate a thrust load. Note also that one ball-drive link 92 may require ball joints on both ends to prevent linkage binding.

Alternative embodiments are contemplated wherein gyro rotor blades 91 are replaced by paddles similar to gyro paddles 59. Said replacement paddles can be pitched to minimize aerodynamic drag and any thrust forces transmitted to push-pull rod 22.

Although the invention has been described and defined in detail with reference to certain preferred embodiments, variations and modifications exist within the scope and spirit of the invention as described and defined in the following claims.

We claim:

1. In a helicopter having a tail rotor with a plurality of rotor blades extending radially from a rotor shaft which is mounted for rotation about a transverse rotor axis, and having a device for automatically stabilizing the yaw motion of the helicopter including a gyro rotor mounted to rotate with the tail rotor and to pivot about a substantially longitudinal pivot axis to automatically vary the collective pitch of the blades in response to yaw motion, a device for restoring the gyro rotor to a nominal orientation, the device comprising gyro drive means and a plurality of aerodynamic paddle means cyclically pitchable in response to pivot of said gyro rotor to generate aerodynamic forces in opposition to pivot of said gyro rotor.

2. The device of claim 1, wherein the rotor shaft is hollow and the gyro rotor is operably mounted at the outboard end of a push-pull rod extending through the hollow shaft.

3. The device of claim 1, wherein gyro drive means comprises drive bars operably connecting tail rotor elements and paddle means to drive the gyro rotor along with the tail rotor and to pitch the paddle means in response to pivot of the gyro rotor.

4. The device of claim 3, wherein the drive bars engage paddle means in delta-drive grips at a delta-drive angle defining the relationship between pivot of the gyro rotor and pitch of paddle means.

5. In a helicopter having a tail rotor with a plurality of rotor blades extending radially from a rotor shaft which is mounted for rotation about a transverse rotor axis, and having a device for automatically stabilizing the yaw motion of the helicopter including a gyro rotor mounted to rotate with the tail rotor and to pivot about a substantially longitudinal pivot axis to automatically vary the collective pitch of the blades in response to yaw motion, a collectively pitchable device for restoring the gyro rotor to a nominal orientation, the collectively pitchable device comprising gyro drive means and a plurality of aerodynamic paddle means collectively pitchable in response to collective pitching of the tail rotor blades and cyclically pitchable in response to pivot of said gyro rotor to generate aerodynamic forces in opposition to pivot of said gyro rotor.

6. The device of claim 5, wherein the rotor shaft is hollow and the gyro rotor is operably mounted at the outboard end of a push-pull rod extending through the hollow shaft.

7. The device of claim 5, wherein gyro drive means comprises drive links operably connecting tail rotor elements and paddle means to drive the gyro rotor along with the tail rotor and to pitch the paddle means in response to pivot of the gyro rotor and in response to collective pitching of the tail rotor blades.

8. The device of claim 5, wherein the paddle means are thrust-producing rotor blades.

9. A device for stabilizing the yaw motion of a helicopter having a main rotor rotatable about a main rotor axis, a power source for driving a tail rotor, and a tail rotor boom with a longitudinal axis, the device comprising a tail rotor mountable to the tail boom of a helicopter to be rotated about a tail rotor axis by the power source to generate a thrust force transverse to the tail boom and offset from the main rotor axis, and gyroscopic means for automatically varying the thrust force generated by the tail rotor to oppose yaw motions, the gyroscopic means including first and second gyro arms, the first gyro arm extending along a first gyro arm pitch axis and the second gyro arm extending along a second gyro arm pitch axis, means for supporting the gyro arms along the gyro arm pitch axes for pivotable movement relative to the tail rotor about a gyro pivot axis between a nominal orientation and a tilted orientation so that the gyro arms pivot about the gyro pivot axis from the nominal orientation toward the tilted orientation in response to yaw motion encountered by the gyro arms during flight to vary the thrust generated by the tail rotor, and means for restoring gyro arms pivoted to a tilted orientation during flight from their tilted orientation to their nominal orientation using air flow engaging the gyro arms during flight to generate an aerodynamic force pivoting the gyro arms about the gyro pivot axis toward the nominal orientation.

10. The device of claim 9, wherein the supporting means includes a gyro hub formed to include a first aperture extending along the first gyro arm pitch axis and receiving the first gyro arm therein and the restoring means includes a gyro arm grip connected to the first gyro arm and rotatable about the first gyro arm pitch axis relative to the gyro hub in response to pivoting of the gyro arms about the gyro pivot axis.

11. The device of claim 9, wherein the gyro hub is formed to include a gyro arm grip-receiving space and the gyro arm grip is positioned to lie within the gyro arm grip-receiving space of the gyro hub.

12. The device of claim 10, wherein the gyro hub is also formed to include a second aperture extending along the second gyro pitch axis and receiving the second gyro arm therein and a second gyro arm grip-receiving space and the restoring means further includes another gyro arm grip connected to the second gyro arm and positioned to lie within the second gyro arm grip-receiving space of the gyro hub and to rotate about the second gyro arm pitch axis in response to pivoting of the gyro arms about the gyro pivot axis.

13. The device of claim 10, wherein the restoring means further includes a drive bar, the gyro arm grip includes a sleeve and a drive bar anchor, the sleeve is appended to the gyro arm, and the drive bar anchor is appended to the drive bar.

14. The device of claim 13, wherein the gyro arm includes a gyro paddle and a shank extending along the first gyro arm pitch axis and interconnecting the gyro paddle and the gyro arm grip and the sleeve of the gyro arm grip is formed to include a shank-receiving passage receiving the shank.

15. The device of claim 13, wherein the drive bar is appended to the drive bar anchor and oriented to lie at an included delta drive angle relative to the first gyro arm pitch axis of less than 90°.

16. The device of claim 9, wherein the restoring means includes a gyro arm grip appended to rotate with the first gyro arm about the first gyro arm pitch axis and a drive bar appended to the gyro arm grip to rotate the gyro arm grip about the first gyro arm pitch axis as the first and second gyro arms pivot about the gyro pivot axis.

17. The device of claim 16, wherein the drive bar is appended to the gyro arm grip and oriented relative to the first gyro arm pitch axis to define an included delta drive angle of less than 90° therebetween.

18. The device of claim 17, wherein the included delta drive angle is about 62.6°.

19. The device of claim 16, further comprising a body formed to include a guide hole and wherein the drive bar includes a first portion and a second portion, the first portion extends through the guide hole formed in the body, and the second portion is appended to the gyro arm grip.

20. The device of claim 19, wherein the gyro arm grip is formed to include a drive bar-receiving aperture and the second portion of the drive bar is positioned to lie in the drive bar-receiving aperture.

21. The device of claim 19, wherein the first portion of the drive bar translates through the guide hole in a first translation direction toward the gyro rotor as the first and second gyro arms pivot about the gyro pivot axis in a first pivot direction and in a second translation direction away from the gyro rotor as the gyro arms pivot about the gyro pivot axis in a second pivot direction.

22. The device of claim 21, wherein the second portion of the drive bar is mounted to the gyro arm grip to pitch the first gyro arm in a first pitch direction about the first gyro arm pitch axis when the drive bar translates through the guide hole in the first translation direction and in a second pitch direction about the first gyro arm pitch axis when the drive bar translates through the guide hole in the second translation direction.

23. The device of claim 16, wherein the drive bar is adapted to be connected to the tail rotor to transfer rotational motion from a power source to the gyro rotor to drive the gyro rotor about a gyro rotor axis of rotation.

24. The device of claim 16, further comprising a scissor linkage, the scissor linkage including a first link defining the drive bar and a second link appended to the first link and adapted to connect to the power source, the first link being pivotably connected to the second link to one of extend and contract in response to pivoting of the first and second gyro arms about the gyro rotor pivot axis.

25. The device of claim 16, wherein the restoring means further includes a second gyro arm grip appended to the second gyro arm and a second drive bar appended to the second gyro arm grip to rotate the second gyro arm grip about the second gyro arm pitch axis as the first and second gyro arms pivot about the gyro pivot axis.

26. The device of claim 25, wherein each of the first and second gyro arm grips include a sleeve appended to the first and second gyro arms, respectively, and a drive bar anchor appended to the first and second drive bars, respectively.

27. The device of claim 26, wherein the sleeves of the first and second gyro arm grips are situated along the first and second gyro arm pitch axes, respectively, the drive bar anchor of the first gyro arm grip extends away from the sleeve of the first gyro arm grip in a first direction, and the drive bar anchor of the second gyro arm grip extends away from the sleeve of the second gyro arm grip in a second direction that is opposite the first direction.

28. The device of claim 25, wherein the first drive bar and first gyro arm grip are configured to rotate the first gyro arm in a first pitch direction about the first gyro arm pitch axis and the second drive bar and second gyro arm grip are configured to rotate the second gyro arm in a second pitch direction about the second gyro-arm pitch axis that is opposite to the first pitch direction.

29. The device of claim 9, wherein the first and second gyro arms include an aerodynamic blade.

30. The device of claim 9, wherein the first gyro arm includes a gyro paddle and a shank extending along the first gyro arm pitch axis to connect the gyro paddle to the support means.

31. The device of claim 9, wherein the supporting means includes a gyro spindle having a base mounted to pivot about the gyro pivot axis and a hub axle appended to the base and arranged to extend away from the tail rotor.

32. The device of claim 31, wherein the supporting means further includes a gyro hub mounted on the hub axle for rotation about the gyro rotor axis of rotation relative to the gyro spindle and the first and second gyro arms are mounted to the gyro hub.

33. The device of claim 9, further comprising pilot means for providing a pilot input to the tail rotor to vary the thrust force generated by the tail rotor.

34. The device of claim 9, wherein the supporting means includes a gyro spindle adapted to pivot about the gyro pivot axis in response to pivoting of the gyro arms and the gyro spindle includes an output linkage offset from the gyro pivot axis and linked to the tail rotor to vary the thrust force generated by the tail rotor in response to pivoting of said gyro spindle about the gyro pivot axis.

35. The device of claim 34, wherein the output linkage is non-rotatably displaced relative to the gyro pivot axis upon pivoting of the gyro arms about the gyro pivot axis.

36. The device of claim 35, wherein the supporting means includes a gyro hub supporting the first and second gyro arms and the gyro spindle supports the gyro hub for rotation about the gyro rotor axis of rotation and pivotable motion about the gyro pivot axis.

37. The device of claim 16, wherein the drive bar is configured to transmit rotational motion to the gyro rotor to drive the gyro rotor about a gyro rotor axis of rotation.

38. The device of claim 9, wherein the restoring means includes a drive ball linked to the gyro arm and a ball drive link having one end rotatably coupled to the drive ball and a second end linked to the tail rotor shaft.

39. The device of claim 36, wherein the drive ball is offset from the gyro pivot axis.

40. A control and stabilization device for a helicopter having a power source for driving a tail rotor, the control and stabilization device comprising a tail rotor mountable to the helicopter to be rotated about a tail rotor axis of rotation by the power source to generate a thrust force, and gyroscopic means for automatically varying the thrust force to oppose yaw motions, the gyroscopic means including first and second gyro arms pivotable about a gyro pivot axis from a nominal orientation to a tilted orientation relative to the tail rotor in response to yaw motions encountered during flight and means for restoring the gyro arms from their tilted orientation to their nominal orientation, the first gyro arm extending along a first gyro arm pitch axis and the second gyro arm extending along a second gyro arm pitch axis, the restoring means including a first gyro arm grip having a sleeve mounted on the first gyro arm for rotation about the first gyro arm pitch axis in response to pivoting of the gyro arms about the gyro pivot axis and a drive bar anchor appended to the sleeve for rotation therewith about the first gyro arm pitch axis and arranged to extend away from the sleeve to define an anchor axis oriented relative to the first gyro arm pitch axis to define an included delta drive angle of less than 90° therebetween, the restoring means further including a first drive bar having an anchored end coupled to the drive bar anchor to move therewith and a free end and a drive bar guider coupled to the free end of the first drive bar.

41. The device of claim 40, further comprising means for supporting the first and second gyro arms to pivot about the gyro pivot axis, the included delta drive angle is about 62.6°, and the gyro arm is mounted on the supporting means to pitch about 12° in response to tilting of the gyroscopic means about 15°.

42. The device of claim 40, wherein the free end of the drive bar extends substantially perpendicular to the anchored end of the drive bar.

43. The device of claim 40, wherein the drive bar guider is formed to include a guide hole and the free end of the drive bar translates through the guide hole in a first translation direction toward the gyro rotor as the first and second of gyro arms pivot about the gyro pivot axis in a first pivot direction and in a second translation direction away from the gyro rotor as the gyro arms pivot about the gyro pivot axis in a second pivot direction.

44. The device of claim 43, wherein the anchored end of the drive bar is mounted to the gyro arm grip to pitch the first gyro arm in a first pitch direction about the first gyro arm pitch axis when the drive bar translates through the guide hole in the first translation direction and in a second pitch direction about the first gyro arm pitch axis when the drive bar translates through the guide hole in the second translation direction.

45. The device of claim 40, wherein the drive bar is adapted to be connected to the tail rotor to transfer rotational motion from a power source to the gyro rotor to drive the gyro rotor about a gyro rotor axis of rotation.

46. The device of claim 40, further comprising a scissor linkage, the scissor linkage including a first link defining the drive bar and a second link appended to the first link and adapted to connect to the power source, the first link being pivotably connected to the second link to one of extend and contract in response to pivoting of the first and second gyro arms about the gyro rotor pivot axis.

47. The device of claim 40, wherein the first and second gyro arms are generally airfoiled in cross section and cooperate to generate aerodynamic forces when rotated about a gyro rotor axis of rotation.

48. The device of claim 40, wherein the first gyro arm includes a gyro paddle and a shank extending along the first gyro arm pitch axis to connect the gyro paddle to the support means.

49. The device of claim 40, wherein the first gyro arm includes an aerodynamic blade.

50. The device of claim 40, wherein the drive bar guider is slidably coupled to the free end of the first drive bar.

51. The device of claim 40, wherein the gyroscopic means further includes a gyro spindle adapted to pivot about the gyro pivot axis in response to pivoting of the gyro arms and the gyro spindle includes an output linkage offset from the gyro pivot axis and linked to the tail rotor to vary the thrust force generated by the tail rotor in response to pivoting of said gyro spindle about the gyro pivot axis.

52. A control and stabilization device for a helicopter having a power source for driving a tail rotor, the control and stabilization device comprising a tail rotor mountable to the helicopter to be rotated about a tail rotor axis of rotation by the power source to generate a thrust force, and a gyro rotor mounted to the helicopter to rotate with the tail rotor, the gyro rotor including first and second variable pitch gyro arms pivotable about a gyro pivot axis from a nominal orientation to a tilted orientation in response to the yaw motions encountered by the gyro arms during flight, the first gyro arm extending along a first gyro arm pitch axis and the second gyro arm extending along a second gyro arm pitch axis, a first gyro arm grip linked to the first gyro arm to rotate with the first gyro arm about the gyro arm pitch axis, and a first pitch link appended to the first gyro arm grip to rotate the first gyro arm grip and said first gyro arm about the gyro arm pitch axis in response to motion of the first pitch link relative to the first gyro arm.

53. The device of claim 52, wherein the first gyro arm grip and the first gyro arm rotate about the first gyro arm pitch axis in response to pivoting of the gyro arms about the gyro pivot axis.

54. The device of claim 52, wherein the first and second gyro arms are generally airfoiled in cross section and are cyclically pitchable in response to pivoting of the gyro rotor to generate aerodynamic forces in opposition to pivoting of said gyro rotor.

55. The device of claim 52, wherein the first and second gyro arms are airfoiled in cross section and are collectively pitchable in response to pivoting of the gyro rotor to generate aerodynamic forces in response to yaw motions.

56. The device of claim 52, wherein the first and second gyro arms are airfoiled in cross section and are collectively pitchable in response to pilot control commands.

57. The device of claim 52, wherein the first pitch link is appended to the gyro arm grip and oriented relative to the first gyro pitch axis to define an included delta drive angle of less than 90° therebetween.

58. The device of claim 52, wherein the included delta drive angle is about 62.6°.

59. The device of claim 52, wherein the pitch link is adapted to be connected to the tail rotor to transfer rotational motion from a power source to the gyro rotor to drive the gyro rotor about a gyro rotor axis of rotation.

60. The device of claim 52, further comprising a scissor linkage, the scissor linkage including a first link defining the pitch link and a second link appended to the first link and adapted to connect to the power source, the first link being pivotably connected to the second link to one of extend and contract in response to pivoting of the first and second gyro arms about the gyro rotor pivot axis.

61. The device of claim 52, wherein the drive bar anchor includes a drive ball linked to the gyro arm and the pitch adjustor linkage includes a ball drive link having one end rotatably coupled to the drive ball and a second end linked to the tail rotor.

62. The device of claim 61, wherein the drive ball is offset from the gyro pivot axis.

63. The device of claim 52, further comprising a gyro hub mounted for pivoting movement relative to the tail rotor about the gyro pivot axis and the first and second gyro arms are appended to the gyro hub.

64. The device of claim 52, wherein the gyro rotor further includes a gyro spindle adapted to pivot about the gyro pivot axis in response to pivoting of the gyro arms and the gyro spindle includes an output linkage offset from the gyro pivot axis and linked to the tail rotor to vary the thrust force generated by the tail rotor in response to pivoting of said gyro spindle about the gyro pivot axis.

65. A control and stabilization device for a helicopter having a power source for driving a tail rotor, the control and stabilization device comprising a tail rotor shaft mountable to the tail boom of a helicopter to be rotated about a tail rotor axis by the power source, a pair of adjustable pitch tail rotor blades mounted on the tail rotor shaft for rotation therewith about the tail rotor axis and for pitching movement relative to the tail rotor shaft about a blade pitching axis during rotation of the tail rotor shaft about the tail rotor axis, a spider coupled to the tail rotor blades to move back and forth along the tail rotor axis during pitching movement of the tail rotor blades about the blade pitching axis, a gyro spindle having a base supported for pivoting movement about a gyro pivot axis and coupled to the spider to allow rotation of the tail rotor shaft, tail rotor blades, and spider relative to the gyro spindle and a hub axle appended to the base to pivot therewith about the gyro pivot axis, a gyro hub mounted on the hub axle for rotation relative to the gyro spindle about a gyro axis of rotation through the hub axle and for pivoting movement with the gyro spindle about the gyro pivot axis, first and second gyro arms coupled to the gyro hub for pivoting movement with the gyro spindle and the gyro hub about the gyro pivot axis and for rotation relative to the gyro hub about the gyro arm pitch axis, the first gyro arm extending along a first gyro arm pitch axis and the second gyro arm extending along a second gyro arm pitch axis, and a gyro arm pitch linkage linked to the tail rotor shaft and coupled to each gyro arm to rotate therewith about the gyro axis of rotation and to pitch the gyro arms relative to the gyro hub about their respective gyro arm pitch axes.

66. The device of claim 65, wherein the gyro arm pitch linkage is coupled to the spider.

67. A device for stabilizing the yaw motion of a helicopter having a main rotor rotatable about a main rotor axis of rotation, a power source for driving a tail rotor, and a tail rotor boom with a longitudinal axis, the device comprising a tail rotor mountable to the tail boom of a helicopter to be rotated about a tail rotor axis of rotation by the power source to generate a thrust force transverse to the tail boom and offset from the main rotor axis of rotation, and gyroscopic means for automatically varying the thrust force generated by the tail rotor to oppose yaw motions, the gyroscopic means including first and second gyro arms being rotatable about a gyro axis of rotation, the first gyro arm extending along a first gyro arm pitch axis and the second gyro arm extending along a second gyro arm pitch axis, means for supporting the gyro arms for pivotable movement about a gyro pivot axis between a nominal orientation and a tilted orientation so that the gyro arms pivot about the gyro pivot axis from the nominal orientation toward the tilted orientation in response to yaw motion encountered by the gyro arms during flight to vary the thrust generated by the tail rotor, and means for using the pivotable movement of the gyro arms from the nominal orientation to the tilted orientation to generate a restoring force to restore the gyro arms from their tilted orientation to their nominal orientation, wherein the restoring force varies as the rate of rotation of the gyro arms varies.

68. The device of claim 67, wherein the first gyro arm includes a blade portion having an airfoiled cross-section, the gyro arm extends radially from the tail rotor axis and pitches cyclically about the gyro pivot axis through pitch angles in response to yaw motion of the helicopter to generate an aerodynamic restoring force that varies with the pitch angle of said gyro arm.

69. The device of claim 67, wherein the restoring means includes a drive bar connected to the first gyro arm to rotate about the gyro rotor axis therewith, whereby movement of the drive bar in response to yaw motion of the helicopter causes said gyro arm to pitch about the first gyro arm pitch axis.

70. The device of claim 69, wherein the drive bar is configured to transmit rotational motion to the gyro rotor to drive the gyro rotor about the gyro rotor axis of rotation.

71. The device of claim 69, further comprising a scissor linkage, the scissor linkage including a first link defining the drive bar and a second link appended to the first link and adapted to connect to the power source, the first link being pivotably connected to the second link to one of extend and contract in response to pivoting of the first and second gyro arms about the gyro rotor pivot axis.

72. The device of claim 67, wherein the tail rotor includes a pair of tail rotor blades, the support means includes a gyro spindle mounted to tilt in response to tilt of the first and second gyro arms about the gyro pivot axis, and further comprising a pitch linkage linking the gyro spindle to the tail rotor to vary the pitch of the tail rotor blades, wherein tilt of the gyro spindle displaces said pitch linkage thereby varying the thrust of the tail rotor.

73. The device of claim 72, wherein the pitch linkage includes a gyro link connected to the gyro spindle and a spider connected to the tail rotor to rotate therewith, and the gyro link is connected to the gyro spindle to transfer gyro stabilization commands from the gyro spindle, in sequence, to the spider and to the tail rotor.

74. The device of claim 67, wherein the first and second gyro arms include an aerodynamic blade.

75. The device of claim 67, further comprising pilot means for providing a pilot input to the tail rotor to vary the thrust force generated by the tail rotor.

76. A device for stabilizing the yaw motion of a helicopter having a main rotor rotatable about a main rotor axis, a power source for driving a tail rotor, and a tail rotor boom with a longitudinal axis, the device comprising a tail rotor mountable to the tail boom of a helicopter to be rotated about a tail rotor axis by the power source to generate a thrust force transverse to the tail boom and offset from the main rotor axis, and gyroscopic means for automatically varying the thrust force generated by the tail rotor to oppose yaw motions, the gyroscopic means including first and second variable pitch gyro arms, the first variable pitch gyro arm extending along a first gyro arm pitch axis and the second variable pitch gyro arm extending along a second gyro arm pitch axis, means for supporting the variable pitch gyro arms for pivotable movement about a gyro pivot axis between a nominal orientation and a tilted orientation so that the variable pitch gyro arms pivot about the gyro pivot axis from the nominal orientation toward the tilted orientation in response to yaw motion encountered by the gyro arms during flight to vary the thrust generated by the tail rotor, and a pitch adjustor linkage appended to the first gyro arm to adjust the pitch of the first gyro arm about the first gyro arm pitch axis.

77. The device of claim 76, wherein the variable pitch gyro arms rotate about a gyro axis of rotation at a rate of rotation and the gyroscopic means further includes means for using the pivotable movement of the variable pitch gyro arms from the nominal orientation to the tilted orientation to generate a restoring force to restore the variable pitch gyro arms from their tilted orientation to their nominal orientation, wherein the restoring force varies as the rate of rotation of the variable gyro arms varies.

78. The device of claim 76, wherein the gyroscopic means further includes means for restoring the variable pitch gyro arms pivoted to a tilted orientation during flight from their tilted orientation to their nominal orientation using air flow engaging the variable pitch gyro arms during flight to generate an aerodynamic force pivoting the variable pitch gyro arms about the gyro pivot axis toward the nominal orientation.

79. The device of claim 76, wherein the first and second variable pitch gyro arms include a thrust-producing rotor blade.

80. The device of claim 76, wherein the tail rotor further includes a plurality of variable pitch tail rotor blades and the variable pitch gyro arms are in communication with the tail rotor and the variable pitch gyro arms are collectively pitchable in conjunction with the tail rotor blades.

81. The device of claim 80, wherein the variable pitch gyro arms are cyclically pitchable in response to pivoting of the variable pitch gyro arms about the gyro pivot axis.

82. The device of claim 80, wherein the tail rotor further includes a tail rotor blade pitch adjustor linkage and the pitch adjustor linkage of the first gyro arm is linked to the tail rotor blade pitch adjustor linkage.

83. A yaw control and stabilization system for use in a helicopter, the yaw control and stabilization system comprising a rotor shaft rotatable about a rotor axis of rotation, and
a pair of rotor blades linked to the rotor shaft, each of the rotor blades being formed to include a blade-pitching axis, a leading edge, a trailing edge spaced apart from the leading edge, and a blade aerodynamic center of pressure, the blade aerodynamic center of pressure being spaced apart from the blade-pitching axis and located between the blade-pitching axis and the leading edge.

84. The yaw control and stabilization system of claim 83, further comprising a balancing weight connected to the rotor blades to set the pitch balance of the rotor blade.

85. The yaw control and stabilization system of claim 84, further comprising a blade grip interconnecting the rotor blade and the rotor shaft and including a weight-holding portion and the balancing weight includes a threaded shaft engaging the weight-holding portion.

86. The yaw control and stabilization system of claim 85, wherein each rotor blade includes a blade root situated adjacent to the rotor hub, an outer edge spaced apart from the blade root, and a blade center-of-pressure line connecting the center-of-pressure points of the interconnected airfoiled cross sections and extending from said blade root to said outer edge, the aerodynamic center-of-pressure line is situated predominantly between the blade-pitching axis and the leading edge thereby positioning the blade aerodynamic center of pressure of the pitch-balanced rotor blade between the blade-pitching axis and the leading edge.

87. The yaw control and stabilization system of claim 86, wherein the axis of rotation defines a 0% semi-span location and the outer edge is situated at a predetermined distance along the blade-pitching axis from the rotor axis of rotation and defines a 100% semi-span location, the rotor blade further includes a 70% semi-span location situated about 70% of the distance from the rotor axis of rotation to the outer edge along the blade-pitching axis, a first distance between the aerodynamic center-of-pressure line and the blade-pitching axis along a 70% semi-span chord line at the 70% semi-span location extending transversely to the blade-pitching axis, and a second distance between the aerodynamic center-of-pressure line and the blade-pitching axis along a 100% semi-span chord line at the 100% semi-span location extending transversely to the blade-pitching axis, and the first distance is greater than the second distance.

88. The yaw control and stabilization system of claim 88, wherein the 100% semi-span location includes a first chord line extending transversely to the blade-pitching axis and a first chord length between the leading edge and the trailing edge along the first chord line, the about 70% semi-span location includes second chord line extending transversely to the blade-pitching axis and a second chord length between the leading edge and the trailing edge along the second chord line, and the first chord length is approximately 60% of the second chord length.

89. The yaw control and stabilization system of claim 83, wherein the pair of rotor blades extend radially outward from the rotor shaft and include interconnected airfoiled cross sections located spanwise with respect to the rotor axis of rotation and chordwise with respect to the blade-pitching axis to position the blade aerodynamic center of pressure of the rotor blade substantially ahead of the blade-pitching axis between the blade-pitching axis and the leading edge to generate an aerodynamic force ahead of the blade-pitching axis.

90. The yaw control and stabilization system of claim 89, wherein the 70% semi-span location includes a 70% semi-span chord line extending transversely to the blade-pitching axis, a chord length between the leading edge and the trailing edge along the chord line, and an aerodynamic center of pressure and the aerodynamic center of pressure of the 70% semi-span location is located on the 70% semi-span chord line approximately 28% of the chord length from the blade-pitching axis to the leading edge.

91. The yaw control and stabilization system of claim 89, wherein approximately 48% of the total surface area of the rotor blade lies between the blade-pitching axis and the leading edge.

92. The yaw control and stabilization system of claim 89, wherein the outer edge is situated at a predetermined distance along the blade-pitching axis from the rotor axis of rotation and defines a 100% semi-span location, the rotor blade further includes a 16% semi-span location situated about 16% of the distance from the rotor axis of rotation to the outer edge along the blade-pitching axis, a 40% semi-span location situated about 40% of the distance from the rotor axis of rotation to the outer edge along the blade-pitching axis, and a 70% semi-span location situated about 70% of the distance from the rotor axis of rotation to the outer edge along the blade-pitching axis, wherein approximately 41% of the surface area of the rotor blade situated between the 16% and 40% spanwise locations is located between the blade-pitching axis and the leading edge, approximately 47% of the surface area of the rotor blade situated between the 40% and 70% spanwise locations is located between the blade-pitching axis and the leading edge, and approximately 54% of the surface area of the blade situated between the 70% and 100% spanwise locations is located between the blade-pitching axis and the leading edge.

93. The yaw control and stabilization system of claim 89, wherein the rotor blade has a center of gravity situated substantially on the blade-pitching axis.

94. The yaw control and stabilization system of claim 89, further comprising a balancing weight connected to the rotor blade to set the pitch balance of the rotor blade.

95. The yaw control and stabilization system of claim 94, further-comprising a blade grip interconnecting the rotor blade and the rotor shaft and wherein the balancing weight is appended to the blade grip.

96. The yaw control and stabilization system of claim 94, wherein the rotor blade includes a blade root situated proximate to the rotor shaft, a lower-surface side, and an upper-surface side and the balancing weight is situated to lie proximate to the rotor blade root and spacially offset from the lower-surface side and the upper-surface side.

97. The yaw control and stabilization system of claim 96, wherein the rotor blade includes a plane extending substantially perpendicular to the lower-surface side and the upper-surface side and extending through the rotor blade-pitching axis and the balancing weight is spacially offset from the plane.

98. The yaw control and stabilization system of claim 89, wherein each rotor blade is made of a plastics material such as nylon.

99. The yaw control and stabilization system of claim 89, wherein each rotor blade includes cambered airfoil cross sections.

100. The yaw control and stabilization system of claim 99, wherein the outer edge is situated at a predetermined distance along the blade-pitching axis from the rotor axis of rotation and defines a 100% semi-span location, the rotor blade further includes a 16% semi-span location situated about 16% of the distance from the rotor axis of rotation to the outer edge along the blade-pitching axis, a 40% semi-span location situated about 40% of the distance from the rotor axis of rotation to the outer edge along the blade-pitching axis, a 70% semi-span location situated about 70% of the distance from the rotor axis of rotation to the outer edge along the blade-pitching axis, a first chord length and a first thickness of approximately 15% of the first chord length at the 16% semi-span location, a second chord length and a second thickness of approximately 4.7% of the second chord length at the 40% semi-span location, a third chord length and a third thickness of approximately 4.6% of the third chord length at the 70% semi-span location, a fourth chord length and a fourth thickness of approximately 6.8% of the fourth chord length at the 100% semi-span location.

101. The yaw control and stabilization system of claim 89, wherein each pitch-balanced rotor blade further includes an upper-surface side and a turbulator strip appended to the upper surface.

102. A rotor system for use in an aircraft, the rotor system comprising
a rotor blade,
a rotor shaft,
a rotor hub coupled to the rotor shaft for rotation therewith about a rotor axis of rotation, and
a unitary and C-shaped reach-around blade grip solely interconnecting the rotor blade and the rotor hub to support the rotor blade for rotation with the rotor hub about the rotor axis of rotation, wherein said blade grip is removable as a unit from the rotor hub.

103. The rotor system of claim 102, wherein the rotor hub includes a rotor hub-bearing surface and the unitary and C-shaped reach-around blade grip includes a base portion formed to include a base pivot hole, a thrust-bearing portion formed to include a thrust pivot hole and a blade grip-bearing surface proximately abutting the rotor hub-bearing surface of the rotor hub, and a connecting portion extending between and interconnecting the base portion and thrust-bearing portion.

104. The rotor system of claim 103, further comprising a first pivot pin situated to extend through the base pivot hole and wherein the unitary and C-shaped reach-around blade grip is pivotable about said first pivot pin.

105. The rotor system of claim 103, further comprising a second pivot pin situated to extend through the thrust pivot hole and wherein the reach-around blade grip is pivotable about said second pivot pin.

106. The rotor system of claim 103, further comprising a thrust washer situated between the blade grip-bearing surface and the rotor hub-bearing surface.

107. The rotor system of claim 106, wherein the thrust washer is made of a low-friction material.

108. The rotor system of claim 102, further comprising a pivot pin, and wherein the unitary and C-shaped reach-around blade grip is formed to include a blade grip hole receptive to the pivot pin, the rotor hub is formed to include a hub pivot hole, and the pivot pin extends through the blade grip hole and into the hub pivot hole.

109. The rotor system of claim 102, wherein the unitary and C-shaped reach-around blade grip and rotor blade are molded as a single member from a plastics material such as nylon.

110. The rotor system of claim 102, wherein the unitary and C-shaped reach-around grip is formed to include a base pivot hole and a thrust pivot hole and further comprising a second unitary and C-shaped reach-around blade grip diametrically opposed about the rotor axis of rotation to the first reach-around blade grip, the second unitary and C-shaped reach-around blade grip being formed to include a base pivot hole and a thrust pivot hole, the first pivot pin extending through the base pivot hole of the first unitary and C-shaped reach-around blade grip and the thrust pivot hole of the second unitary and C-shaped reach-around blade grip, and the second pivot pin extending through the base pivot hole of the second unitary and C-shaped reach-around blade grip and the thrust pivot hole of the first unitary and C-shaped reach-around blade grip to form an interlocking rotor blade grip assembly having independently variable pitch rotor blade grips.

111. The rotor system of claim 102, further comprising a pivot bolt defining a pitch axis and extending through apertures formed in the rotor blade and the unitary and C-shaped reach-around blade grip and a pitch linkage connected to the unitary and C-shaped reach-around blade grip and configured to move relative to the rotor hub to change the pitch of the rotor blade about the pitch axis.

112. The rotor system of claim 111, wherein the pitch linkage includes a spider link and a blade pitch pin, and the reach-around blade grip is formed to include a pitch pin hole configured to receive the blade pitch pin to pivotably interconnect the spider link to the reach-around grip.

* * * * *